United States Patent
Edwards et al.

(10) Patent No.: US 11,063,980 B2
(45) Date of Patent: Jul. 13, 2021

(54) SYSTEM AND METHOD FOR ASSOCIATING ENCRYPTION KEY MANAGEMENT POLICY WITH DEVICE ACTIVITY

(71) Applicant: Fornetix LLC, Leesburg, VA (US)

(72) Inventors: Stephen Edwards, Shepherdstown, WV (US); Gerald J. Stueve, Herndon, VA (US); Gary C. Gardner, Sterling, VA (US); Charles White, Charles Town, WV (US)

(73) Assignee: Fornetix LLC, Frederick, MD (US)

( * ) Notice: Subject to any disclaimer, the term of this patent is extended or adjusted under 35 U.S.C. 154(b) by 15 days.

(21) Appl. No.: 15/439,861

(22) Filed: Feb. 22, 2017

(65) Prior Publication Data

US 2017/0251023 A1 Aug. 31, 2017

Related U.S. Application Data

(60) Provisional application No. 62/300,699, filed on Feb. 26, 2016.

(51) Int. Cl.
*H04L 29/06* (2006.01)
*H04L 9/08* (2006.01)
(Continued)

(52) U.S. Cl.
CPC ............ *H04L 63/20* (2013.01); *G06F 21/604* (2013.01); *G06F 21/6209* (2013.01);
(Continued)

(58) Field of Classification Search
CPC ....... H04L 63/06; H04L 63/20; H04L 63/061; H04L 63/062; H04L 63/0853;
(Continued)

(56) References Cited

U.S. PATENT DOCUMENTS 4,316,055 A 2/1982 Feistel
5,889,953 A 3/1999 Thebaut et al.
(Continued)

FOREIGN PATENT DOCUMENTS

EP 1 396 979 A2 3/2004
EP 2 055 064 B1 2/2013
(Continued)

OTHER PUBLICATIONS

Wang et al., An Efficient File Hierarchy Attribute-Based Encryption Scheme in Cloud Computing, IEEE (Year: 2016).*
(Continued)

*Primary Examiner* — Noura Zoubair
*Assistant Examiner* — Mahabub S Ahmed
(74) *Attorney, Agent, or Firm* — Foley & Lardner LLP

(57) ABSTRACT

Examples described herein relate to systems and methods for integrating and implementing ad hoc groups within a policy hierarchy environment. The ad hoc groups may implement particular guidelines for group membership, policy evaluations, and group actions. Systems and methods provide a framework for creating groups, removing groups, and associating groups, nodes, clients, and users with groups and policy. In some examples, there is provided a method for implementing ad hoc groups in a policy hierarchy environment, the method including: receiving a key orchestration operation request at a client associated with a node, a group, and a user; applying a sum of policies associated with the node to the request; applying a sum of policies associated with the group to the request; applying a sum of policies associated with the client to the request; applying a sum of policies associated with the user to the request; and evaluating the key orchestration operation request based on each of the sum of policies of the node, the group, the client, and the user.

20 Claims, 14 Drawing Sheets

US 11,063,980 B2

Page 2

(51) Int. Cl.
G06F 21/62 (2013.01)
G06F 21/60 (2013.01)

(52) U.S. Cl.
CPC ............ *H04L 9/088* (2013.01); *H04L 9/0836* (2013.01); *H04L 63/061* (2013.01); *H04L 63/062* (2013.01); *H04L 63/064* (2013.01); *H04L 63/0853* (2013.01); *H04L 63/104* (2013.01)

(58) Field of Classification Search
CPC ....... H04L 63/104; H04L 9/085; H04L 9/088; G06F 21/604; G06F 21/6209
USPC .......................................................... 713/171
See application file for complete search history.

(56) References Cited

U.S. PATENT DOCUMENTS

| | | | |
|---|---|---|---|
| 6,330,562 B1 | 12/2001 | Boden et al. | |
| 7,065,643 B1* | 6/2006 | Cornils | H04L 9/0822 380/273 |
| 7,333,616 B1* | 2/2008 | Brettle | H04L 9/0894 380/277 |
| 7,412,059 B1* | 8/2008 | Pauker | H04L 63/0442 380/277 |
| 7,607,164 B2 | 10/2009 | Vasishth et al. | |
| 7,610,484 B2 | 10/2009 | Kapoor | |
| 7,827,596 B2* | 11/2010 | Loen | H04L 63/12 726/4 |
| 7,912,856 B2* | 3/2011 | Hannel | H04L 63/0272 707/781 |
| 8,099,598 B1 | 1/2012 | Liu | |
| 8,116,455 B1 | 2/2012 | Sussland et al. | |
| 8,116,456 B2 | 2/2012 | Thomas | |
| 8,213,620 B1* | 7/2012 | Sussland | H04L 9/0894 380/278 |
| 8,214,636 B2 | 7/2012 | Kapoor | |
| 8,230,223 B2* | 7/2012 | Brettle | H04L 9/0894 713/173 |
| 8,352,725 B1* | 1/2013 | O'Toole, Jr. | H04L 63/20 713/151 |
| 8,429,400 B2* | 4/2013 | Khalid | H04L 9/0833 380/285 |
| 8,538,028 B2 | 9/2013 | Yeap et al. | |
| 8,559,631 B1 | 10/2013 | Waters | |
| 8,726,343 B1* | 5/2014 | Borzycki | H04L 63/0815 726/1 |
| 8,793,508 B2 | 7/2014 | Von Behren et al. | |
| 8,943,316 B2* | 1/2015 | Vainstein | G06F 21/6218 713/165 |
| 8,964,982 B2 | 2/2015 | Takeuchi et al. | |
| 8,995,660 B2 | 3/2015 | Kobayashi et al. | |
| 9,258,117 B1* | 2/2016 | Roth | H04L 9/0861 |
| 9,294,270 B2* | 3/2016 | Wainner | H04L 12/1818 |
| 9,369,490 B2 | 6/2016 | Fouladgar et al. | |
| 9,565,227 B1 | 2/2017 | Helter et al. | |
| 9,639,589 B1 | 5/2017 | Theimer et al. | |
| 9,660,969 B2* | 5/2017 | Qian | H04L 63/102 |
| 9,716,728 B1 | 7/2017 | Tumulak | |
| 9,729,577 B2 | 8/2017 | White et al. | |
| 9,853,979 B1* | 12/2017 | Roth | H04L 63/10 |
| 9,858,433 B2* | 1/2018 | Hammoutene | G06F 21/6245 |
| 9,967,289 B2 | 5/2018 | White et al. | |
| 9,977,921 B2* | 5/2018 | Sprague | G06F 21/6209 |
| 10,257,175 B2 | 4/2019 | Thunuguntla et al. | |
| 10,523,645 B2 | 12/2019 | Zhu et al. | |
| 10,547,598 B2 | 1/2020 | Cates et al. | |
| 2002/0124086 A1* | 9/2002 | Mar | H04L 69/22 709/226 |
| 2003/0018786 A1 | 1/2003 | Lortz | |
| 2003/0035548 A1* | 2/2003 | Kwan | H04L 63/04 380/286 |
| 2003/0079085 A1 | 4/2003 | Ang | |
| 2003/0115456 A1 | 6/2003 | Kapoor | |
| 2003/0126464 A1* | 7/2003 | McDaniel | G06F 21/604 726/4 |
| 2003/0140257 A1* | 7/2003 | Peterka | G06F 21/10 726/12 |
| 2003/0154404 A1 | 8/2003 | Beadles et al. | |
| 2003/0176931 A1 | 9/2003 | Pednault et al. | |
| 2004/0030888 A1 | 2/2004 | Roh et al. | |
| 2004/0039594 A1 | 2/2004 | Narasimhan et al. | |
| 2004/0073928 A1 | 4/2004 | Alakoski et al. | |
| 2004/0086125 A1 | 5/2004 | Lain et al. | |
| 2004/0141509 A1 | 7/2004 | Sahni et al. | |
| 2004/0151308 A1 | 8/2004 | Kacker et al. | |
| 2004/0247131 A1 | 12/2004 | Buer | |
| 2005/0039031 A1* | 2/2005 | Mont | H04L 9/083 713/189 |
| 2005/0053232 A1 | 3/2005 | Bace | |
| 2005/0071439 A1 | 3/2005 | Bookman et al. | |
| 2005/0086477 A1 | 4/2005 | Lin et al. | |
| 2005/0289264 A1 | 12/2005 | Illowsky et al. | |
| 2006/0031407 A1 | 2/2006 | Dispensa et al. | |
| 2006/0041725 A1* | 2/2006 | Lakshmanamurthy | H04L 45/742 711/154 |
| 2006/0147043 A1 | 7/2006 | Mann et al. | |
| 2006/0161774 A1 | 7/2006 | Huh et al. | |
| 2006/0190722 A1 | 8/2006 | Sharma et al. | |
| 2006/0233363 A1 | 10/2006 | Graunke | |
| 2006/0236363 A1* | 10/2006 | Heard | H04L 63/101 726/1 |
| 2006/0242685 A1* | 10/2006 | Heard | G06F 21/577 726/3 |
| 2007/0011736 A1 | 1/2007 | Kalibjian et al. | |
| 2007/0071243 A1 | 3/2007 | Nanda | |
| 2007/0116266 A1 | 5/2007 | Greco et al. | |
| 2007/0143407 A1 | 6/2007 | Avritch et al. | |
| 2007/0280483 A1 | 12/2007 | Fu et al. | |
| 2008/0016001 A1 | 1/2008 | Nakano et al. | |
| 2008/0016335 A1 | 1/2008 | Takahashi et al. | |
| 2008/0016550 A1* | 1/2008 | McAlister | H04L 63/105 726/1 |
| 2008/0059474 A1 | 3/2008 | Lim | |
| 2008/0077794 A1 | 3/2008 | Arnold et al. | |
| 2008/0118070 A1 | 5/2008 | Yeap et al. | |
| 2008/0209221 A1* | 8/2008 | Vennelakanti | H04L 63/06 713/183 |
| 2008/0216153 A1 | 9/2008 | Aaltonen et al. | |
| 2008/0282314 A1 | 11/2008 | Abzarian et al. | |
| 2008/0301438 A1 | 12/2008 | Parkinson | |
| 2009/0044259 A1 | 2/2009 | Bookman et al. | |
| 2009/0080658 A1 | 3/2009 | Waters et al. | |
| 2009/0083209 A1 | 3/2009 | Corl et al. | |
| 2009/0089579 A1 | 4/2009 | Murase et al. | |
| 2009/0092252 A1* | 4/2009 | Noll | H04L 9/083 380/277 |
| 2009/0100268 A1* | 4/2009 | Garcia | G06F 21/6209 713/184 |
| 2009/0110189 A1 | 4/2009 | Mayer et al. | |
| 2009/0144380 A1 | 6/2009 | Kallman et al. | |
| 2009/0178106 A1 | 7/2009 | Feng et al. | |
| 2009/0198997 A1 | 8/2009 | Yeap et al. | |
| 2009/0240725 A1 | 9/2009 | Curtis et al. | |
| 2009/0271627 A1 | 10/2009 | Cohen et al. | |
| 2009/0327714 A1 | 12/2009 | Yaghmour | |
| 2010/0011412 A1 | 1/2010 | Maximilien et al. | |
| 2010/0058072 A1* | 3/2010 | Teow | G06F 21/6218 713/193 |
| 2010/0061555 A1* | 3/2010 | Ducharme | G06F 21/00 380/277 |
| 2010/0064341 A1 | 3/2010 | Aldera | |
| 2010/0125736 A1 | 5/2010 | Jang et al. | |
| 2010/0146582 A1* | 6/2010 | Jaber | G06F 21/6218 726/1 |
| 2010/0189262 A1* | 7/2010 | Ducharme | H04L 9/0894 380/277 |
| 2010/0208898 A1* | 8/2010 | Acar | H04L 9/0833 380/280 |

(56) References Cited

U.S. PATENT DOCUMENTS

| | | |
|---|---|---|
| 2010/0246827 A1* | 9/2010 | Lauter .............. G06F 21/6209 380/278 |
| 2010/0246828 A1 | 9/2010 | Johnston |
| 2010/0266132 A1 | 10/2010 | Bablani et al. |
| 2010/0299759 A1 | 11/2010 | Kim et al. |
| 2010/0332820 A1 | 12/2010 | Matsushima et al. |
| 2011/0038483 A1 | 2/2011 | Goeller et al. |
| 2011/0047610 A1* | 2/2011 | Mylavarapu ............ H04L 63/20 726/12 |
| 2011/0072135 A1* | 3/2011 | Hannel .............. H04L 63/0227 709/225 |
| 2011/0072274 A1 | 3/2011 | Leoutsarakos et al. |
| 2011/0110525 A1 | 5/2011 | Gentry |
| 2011/0113235 A1 | 5/2011 | Erickson |
| 2011/0131275 A1* | 6/2011 | Maida-Smith ...... G06F 21/6209 709/204 |
| 2011/0164747 A1 | 7/2011 | Junod et al. |
| 2011/0164752 A1* | 7/2011 | Wainner ............. H04L 63/0428 380/277 |
| 2011/0167470 A1 | 7/2011 | Walker et al. |
| 2011/0173202 A1 | 7/2011 | Paknad et al. |
| 2011/0182180 A1* | 7/2011 | Riddle .............. H04L 41/0893 370/230 |
| 2011/0231443 A1 | 9/2011 | Hannel |
| 2011/0296171 A1 | 12/2011 | Fu et al. |
| 2011/0296173 A1 | 12/2011 | Agrawal et al. |
| 2012/0011560 A1 | 1/2012 | Natarajan et al. |
| 2012/0036370 A1 | 2/2012 | Lim et al. |
| 2012/0099728 A1 | 4/2012 | Rich et al. |
| 2012/0110328 A1 | 5/2012 | Pate et al. |
| 2012/0131164 A1 | 5/2012 | Bryan et al. |
| 2012/0143876 A1 | 6/2012 | Srinivasan et al. |
| 2012/0144186 A1 | 6/2012 | Puiggali Allepuz et al. |
| 2012/0159178 A1 | 6/2012 | Lin et al. |
| 2012/0204032 A1 | 8/2012 | Wilkins et al. |
| 2012/0297200 A1* | 11/2012 | Thom .................... G06F 21/57 713/189 |
| 2012/0324482 A1 | 12/2012 | Park |
| 2013/0019090 A1 | 1/2013 | Wicker |
| 2013/0044878 A1 | 2/2013 | Rich et al. |
| 2013/0044882 A1 | 2/2013 | Rich et al. |
| 2013/0097123 A1* | 4/2013 | McColgan .......... G06F 16/9535 707/690 |
| 2013/0148810 A1 | 6/2013 | Goel et al. |
| 2013/0232336 A1 | 9/2013 | Cheung et al. |
| 2013/0247142 A1 | 9/2013 | Nishizawa et al. |
| 2013/0262612 A1 | 10/2013 | Langas et al. |
| 2013/0262866 A1 | 10/2013 | Gu |
| 2013/0268753 A1 | 10/2013 | Vanderpol et al. |
| 2013/0318343 A1 | 11/2013 | Bjarnason et al. |
| 2014/0006685 A1 | 1/2014 | Peterson et al. |
| 2014/0013110 A1 | 1/2014 | Thoniel et al. |
| 2014/0019753 A1* | 1/2014 | Lowry .................... H04L 9/083 713/155 |
| 2014/0068273 A1* | 3/2014 | Sobel .................. G06F 21/604 713/189 |
| 2014/0095890 A1 | 4/2014 | Mangalore et al. |
| 2014/0108814 A1* | 4/2014 | Bharadwaj ............ H04L 9/0836 713/189 |
| 2014/0122895 A1 | 5/2014 | Khosravi et al. |
| 2014/0177830 A1 | 6/2014 | Gajek |
| 2014/0189783 A1 | 7/2014 | Kapoor et al. |
| 2014/0195564 A1 | 7/2014 | Talagala et al. |
| 2014/0229736 A1* | 8/2014 | Asim .................... H04L 9/0836 713/171 |
| 2014/0229739 A1* | 8/2014 | Roth .................... H04L 63/0442 713/189 |
| 2014/0344571 A1* | 11/2014 | Adam ................. G06F 21/6218 713/165 |
| 2014/0365764 A1 | 12/2014 | Buer |
| 2015/0006882 A1 | 1/2015 | Hernandez et al. |
| 2015/0013018 A1 | 1/2015 | Yan |
| 2015/0082041 A1* | 3/2015 | Gaspar Cuevas ....... H04L 9/083 713/171 |
| 2015/0086020 A1* | 3/2015 | Harjula .................... H04L 9/30 380/279 |
| 2015/0095970 A1 | 4/2015 | Shetty et al. |
| 2015/0098567 A1 | 4/2015 | Park |
| 2015/0101012 A1* | 4/2015 | White .................. G06F 16/245 726/1 |
| 2015/0106626 A1 | 4/2015 | Kremp et al. |
| 2015/0149427 A1 | 5/2015 | Kerschbaum et al. |
| 2015/0186657 A1* | 7/2015 | Nakhjiri ................ H04L 9/0894 713/155 |
| 2015/0222606 A1 | 8/2015 | Yan |
| 2015/0244684 A1* | 8/2015 | Ng .......................... H04L 67/10 713/168 |
| 2015/0254150 A1 | 9/2015 | Gordan et al. |
| 2015/0271147 A1* | 9/2015 | Tanizawa .............. H04L 9/0852 713/171 |
| 2015/0271158 A1* | 9/2015 | Ronca .................. H04L 9/0819 713/168 |
| 2015/0304309 A1 | 10/2015 | Verma |
| 2015/0319146 A1 | 11/2015 | Chen et al. |
| 2015/0358153 A1 | 12/2015 | Gentry |
| 2015/0372997 A1* | 12/2015 | Lokamathe .......... H04L 63/062 713/171 |
| 2015/0381578 A1* | 12/2015 | Thota .................. H04L 63/1408 713/168 |
| 2016/0004481 A1 | 1/2016 | Lakshman |
| 2016/0014095 A1 | 1/2016 | Strayer et al. |
| 2016/0044003 A1 | 2/2016 | Raykova et al. |
| 2016/0080380 A1 | 3/2016 | Dawoud et al. |
| 2016/0127333 A1* | 5/2016 | Sood .................. H04L 63/0272 380/44 |
| 2016/0140347 A1 | 5/2016 | Schaad |
| 2016/0182470 A1* | 6/2016 | Rubin .................. H04L 63/06 713/168 |
| 2016/0234129 A1* | 8/2016 | Konoura ............... H04L 47/781 |
| 2016/0269179 A1 | 9/2016 | White et al. |
| 2016/0269364 A1 | 9/2016 | White et al. |
| 2016/0269370 A1 | 9/2016 | White et al. |
| 2016/0269373 A1 | 9/2016 | White et al. |
| 2016/0277187 A1* | 9/2016 | Nabeel ..................... H04L 9/085 |
| 2016/0294548 A1 | 10/2016 | Qian et al. |
| 2016/0315765 A1* | 10/2016 | Zheng ................. G06F 21/6209 |
| 2016/0366141 A1* | 12/2016 | Smith .................... H04L 63/062 |
| 2016/0373455 A1 | 12/2016 | Shokhrin et al. |
| 2017/0093819 A1 | 3/2017 | Thunuguntla et al. |
| 2017/0103227 A1 | 4/2017 | Kerschbaum et al. |
| 2017/0139640 A1 | 5/2017 | Bakre et al. |
| 2017/0250964 A1 | 8/2017 | Edwards et al. |
| 2017/0251022 A1 | 8/2017 | White et al. |
| 2017/0286454 A1 | 10/2017 | Saeki et al. |
| 2017/0324780 A1* | 11/2017 | White .................... H04L 63/20 |
| 2018/0109504 A1 | 4/2018 | Poffenbarger |
| 2018/0144148 A1* | 5/2018 | Rattan .................. G06F 21/602 |
| 2018/0176017 A1 | 6/2018 | Rodriguez et al. |
| 2018/0278595 A1* | 9/2018 | Zhang .................... H04L 9/083 |
| 2018/0294975 A1 | 10/2018 | Woods et al. |

FOREIGN PATENT DOCUMENTS

| | | |
|---|---|---|
| EP | 2 995 038 A4 | 11/2016 |
| FR | 2922392 B1 | 4/2009 |
| GB | 2 471 282 | 12/2010 |
| GB | 2 472 491 B | 9/2013 |
| WO | WO-03/073762 | 9/2003 |
| WO | WO-2008/061344 A1 | 5/2008 |
| WO | WO-2010/150008 A2 | 12/2010 |
| WO | WO-2018/075912 A1 | 4/2018 |
| WO | WO-2019/129842 A1 | 7/2019 |

OTHER PUBLICATIONS

International Search Report and Written Opinion dated Aug. 30, 2016, from related application No. PCT/US2016/022363.
International Search Report and Written Opinion dated Aug. 30, 2016, from related application No. PCT/US2016/022366.
PCT International Search Report and Written Opinion dated Jul. 12, 2016, from related application No. PCT/US2016/022360.

(56) References Cited

OTHER PUBLICATIONS

PCT International Search Report and Written Opinion dated Jun. 29, 2016, from related application No. PCT/US2016/022357.
Chae, et al, "A Key Recovery Attack on Discrete Log-based Schemes Using a Prime Order Subgroup", ICRC 2010, pp. 249-262.
International Preliminary Report on Patentability dated Sep. 21, 2017, from application No. PCT/US2016/022357.
International Preliminary Report on Patentability dated Sep. 21, 2017, from application No. PCT/US2016/022360.
International Preliminary Report on Patentability dated Sep. 21, 2017, from application No. PCT/US2016/022363.
International Preliminary Report on Patentability dated Sep. 28, 2017, from application No. PCT/US2016/022366.
U.S. Office Action dated Oct. 27, 2017, from U.S. Appl. No. 15/067,084.
International Search Report and Written Opinion dated Jun. 1, 2017, from related application No. PCT/US2017/019202.
International Search Report and Written Opinion dated Jun. 2, 2017, from related application No. PCT/US2017/019162.
International Search Report and Written Opinion dated Jun. 2, 2017, from related application No. PCT/US2017/019205.
International Search Report and Written Opinion dated Jun. 2, 2017, from related application No. PCT/US2017/019209.
International Search Report and Written Opinion dated May 24, 2017, from related application No. PCT/US2017/019204.
International Search Report and Written Opinion dated May 30, 2017, from related application No. PCT/US2017/019207.
U.S. Office Action dated Dec. 26, 2017, from U.S. Appl. No. 15/067,074.
U.S. Office Action dated Nov. 16, 2017, from U.S. Appl. No. 15/067,814.
U.S. Notice of Allowance dated Mar. 26, 2018, from U.S. Appl. No. 15/067,814.
Anonymous, "File system permissions", Feb. 27, 2015, XP055487883, retrieved from the Internet: URL: https://en.wikipedia.org/w/index.php?title=File_system_permission&oldid=649024735, [retrieved on Jun. 26, 2018], p. 1-4, 7 pages.
Anonymous, "How ACL inheritance works", Feb. 28, 2014, XP055487629, retrieved from the Internet: URL: https://library.netapp.com.ecmdocs/ECMP1401220/html/GUID-9320A39F-F278-4368-B8AB-561856881E5F.html, [retrieved on Jun. 25, 2018], 2 pages.
Extended European Search Report dated Jul. 10, 2018, from application No. 16762710.8.
Extended European Search Report dated Jul. 24, 2018, from application No. 16762706.6.
Extended European Search Report dated Jul. 3, 2018, from application No. 16762708.2.
Final Office Action dated Jul. 10, 2018, from U.S. Appl. No. 15/067,074.
U.S. Office Action dated Jun. 6, 2018, from U.S. Appl. No. 15/067,035.
U.S. Office Action dated May 18, 2018, from U.S. Appl. No. 15/067,084.
Non-Final Office Action dated Dec. 31, 2018, from U.S. Appl. No. 15/954,280.
Non-Final Office Action dated Nov. 2, 2018, from U.S. Appl. No. 15/439,455.
Non-Final Office Action dated Oct. 19, 2018, from U.S. Appl. No. 15/067,084.
Non-Final Office Action dated Oct. 29, 2018, from U.S. Appl. No. 15/439,077.
Final Office Action dated Sep. 14, 2018, from U.S. Appl. No. 15/067,035.
International Preliminary Report on Patentability dated Sep. 7, 2018, from application No. PCT/US2017/019162.
International Preliminary Report on Patentability dated Sep. 7, 2018, from application No. PCT/US2017/019204.
International Preliminary Report on Patentability dated Sep. 7, 2018, from application No. PCT/US2017/019205.
Non-Final Office Action dated Oct. 4, 2018, from U.S. Appl. No. 15/439,873.
Non-Final Office Action dated Sep. 7, 2018, from U.S. Appl. No. 15/439,839.
Final Office Action dated May 16, 2019, from U.S. Appl. No. 15/067,084.
Non-Final Office Action dated Mar. 5, 2019, from U.S. Appl. No. 15/067,035.
Final Office Action dated Jul. 17, 2019, from U.S. Appl. No. 15/067,035.
Israeli Office Action dated Jun. 23, 2019, from application No. 254561.
Israeli Office Action dated Jun. 25, 2019, from application No. 254381.
Final Office Action dated Jun. 6, 2019, from U.S. Appl. No. 15/954,280.
Notice of Allowance dated Jun. 3, 2019, from U.S. Appl. No. 15/067,074.
Australian Examination Report dated Oct. 11, 2019, from application No. 2016228528.
Corrected Notice of Allowability dated Nov. 13, 2019, from U.S. Appl. No. 15/954,280.
Non-Final Office Action dated Oct. 25, 2019, from U.S. Appl. No. 15/439,077.
Notice of Allowance on U.S. Appl. No. 15/067,035 dated Nov. 26, 2019.
Australian Examination Report dated Oct. 3, 2019, for application No. 2016228526.
Australian Examination Report dated Sep. 30, 2019, for application No. 2016228531.
Extended European Search Report dated Oct. 11, 2019, from application No. 17757244.3.
Notice of Allowance dated Sep. 23, 2019, from U.S. Appl. No. 15/954,280.
Notice of Allowance dated Sep. 27, 2019, from U.S. Appl. No. 15/067,035.
Pirretti, et al., "Secure Attribute-Based Systems", Proceedings of the 13th. ACM Conference on Computer and Communications Security, Oct. 30-Nov. 3, 2006, pp. 99-112.
Notice of Allowance dated Dec. 18, 2019, from U.S. Appl. No. 15/067,074.
Anonymous, "apache 2.2—What are the symlinks for in /etc/ssl/private ?(Ubuntu server)—Server Fault", Jul. 11, 2010, Retrieved from the Internet: URL:https//serverfault.com/questions/159368/what-are-the-symlinks-for-in-etc-ssl-private-ubuntu-server.
Anonymous, "Symbolic link—Wikipedia", Mar. 5, 2015, Retrieved from the Internet: URL:https://en.wikipedia.org/w/index.php?title=Symbolic_ink&oldid=650003488.
Australian Examination Report dated May 18, 2020, from application No. 2016228531.
European Office Action dated Apr. 28, 2020, from application No. 16762708.2.
European Office Action dated Apr. 30, 2020, from application No. 16762710.8.
European Office Action dated May 4, 2020, from application No. 16762706.6.
Grolimund, et al., "Cryptree: A Folder Tree Structure for Cryptographic File Systems", Reliable Distributed Systems, 2006, SRDS '06. 25th IEEE Symposium on, IEEE, PI, Oct. 1, 2006, pp. 189-198.
Non-Final Office Action dated May 14, 2020, from U.S. Appl. No. 15/067,084.
Notice of Allowance dated Sep. 9, 2020, from U.S. Appl. No. 15/067,084.
European Office Action dated Dec. 16, 2020, from application No. 16762706.6.
Indian Examination Report dated Jan. 30, 2021, from application No. 201747032241.
Indian Examination Report dated Mar. 28, 2021, from application No. 201747032242.

(56) References Cited

OTHER PUBLICATIONS

Israel Office Action dated Apr. 11, 2021, from application No. 278880.
Indian Examination Report dated May 3, 2021, from application No. 201747032243.

* cited by examiner

1200

| Node Y | | | |
|---|---|---|---|
| Policy Name | Policy Value | Policy Type | Policy Operation |
| Job. Transaction. Create Key | True | Boolean | ADD |
| Job. Transaction. Create Key. Size | 256 | <= | ADD |
| Job. Transaction. Create Key. Size | 128 | >= | ADD |
| Job. Transaction. Create Key. Size | 257 | < | ADD |
| Job. Transaction. Create Key. Size | 127 | > | ADD |
| Job. Transaction. Get Attribute. Deleted_Date | | NULL | ADD |
| Job. Transaction. Get Attribute. Object Group | Fresh | MEMBER_OF | ADD |

| Group X | | | |
|---|---|---|---|
| Policy Name | Policy Value | Policy Type | Policy Operation |
| Job. Transaction. Create Key. Encryption Mask | ENCRYPT DECRYPT ENCRYPT \| DECRYPT | ONE_OF | ADD |
| Job. Transaction. Create Key. Name | | NOT NULL | ADD |

| Client Z | | | |
|---|---|---|---|
| Policy Name | Policy Value | Policy Type | Policy Operation |
| Job. Transaction. Create Key. Name | foo | EQ | ADD |

| User Key Admin | | | |
|---|---|---|---|
| Policy Name | Policy Value | Policy Type | Policy Operation |
| Job. Transaction. Create Key | True | Boolean | ADD |
| Job. Transaction. Create Key. Size | 256 | <= | ADD |
| Job. Transaction. Create Key. Size | 128 | >= | ADD |
| Job. Transaction. Create Key. Size | 257 | < | ADD |
| Job. Transaction. Create Key. Size | 127 | > | ADD |
| Job. Transaction. Get Attribute. Deleted_Date | | NULL | ADD |
| Job. Transaction. Get Attribute. Object Group | Fresh | MEMBER_OF | ADD |

FIG 12

SYSTEM AND METHOD FOR ASSOCIATING ENCRYPTION KEY MANAGEMENT POLICY WITH DEVICE ACTIVITY

CROSS-REFERENCE TO RELATED APPLICATIONS

This application claims priority Provisional Application No. 62/300,699, titled System And Method For Associating Encryption Key Management Policy With Device Activity, filed Feb. 26, 2016, and is incorporated herein by reference in its entirety. The present disclosure relates to U.S. patent application Ser. No. 14/506,346, titled System And Method For Encryption Key Management Federation And Distribution, and filed Oct. 3, 2014, which is incorporated herein by reference in its entirety. The present disclosure also relates to U.S. provisional patent application Ser. No. 62/132,372, titled KO Hierarchy For Key Orchestration System And Process, and filed Mar. 12, 2015, which is incorporated herein by reference in its entirety.

BACKGROUND

In security systems, an encryption key refers to a parameter or data that dictates how plain data may be translated into encrypted data during an encryption process and encrypted data into plain data during a decryption process. Typically, the encryption key is made available both of a source device (e.g., a transmitting device) and a target device (e.g., a receiving device) in a communication transaction. Given that encryption keys are used pervasively, effective management of the encryption keys (as well as other security objects) to defend and respond to threats against the security systems is of paramount importance.

Traditionally, encryption key management is initiated and executed at the device level (e.g., by the source device and/or the target device that are involved in the communication transaction). Communication management, on the other hand, is traditionally centrally managed at a higher level (e.g., by a server for the source device and target device). The end result may be that the encryption management is procedurally unsynchronized with communications management. Thus, loose controls of encryption keys, as demonstrated in current public key infrastructure (PKI) instances, may result. In addition, loose controls of symmetric keys generated and distributed in an enterprise may also occur. Accordingly, an end result may be a breakdown in communication management or communication security. Similar problems confront other types of encryption objects.

Traditionally, industry encryption management systems provide for the capability to implement ad hoc groups. However, these systems cannot automatically account for association for policy, especially given the ad hoc relationship of groups to other groups. Thus, traditional ad hoc groups may not have been effective in a policy-driven environment.

SUMMARY

Examples described herein relate to systems and methods for integrating and implementing ad hoc groups within a policy hierarchy environment. The ad hoc groups may implement particular guidelines for group membership, policy evaluations, and group actions. Systems and methods provide a framework for creating groups, removing groups, and associating groups, nodes, clients, and users with groups and policy.

BRIEF DESCRIPTION OF THE DRAWINGS

FIG. 12 is a table illustrating examples of policies having complex logical operations according to some examples.

DETAILED DESCRIPTION

Figure 1:
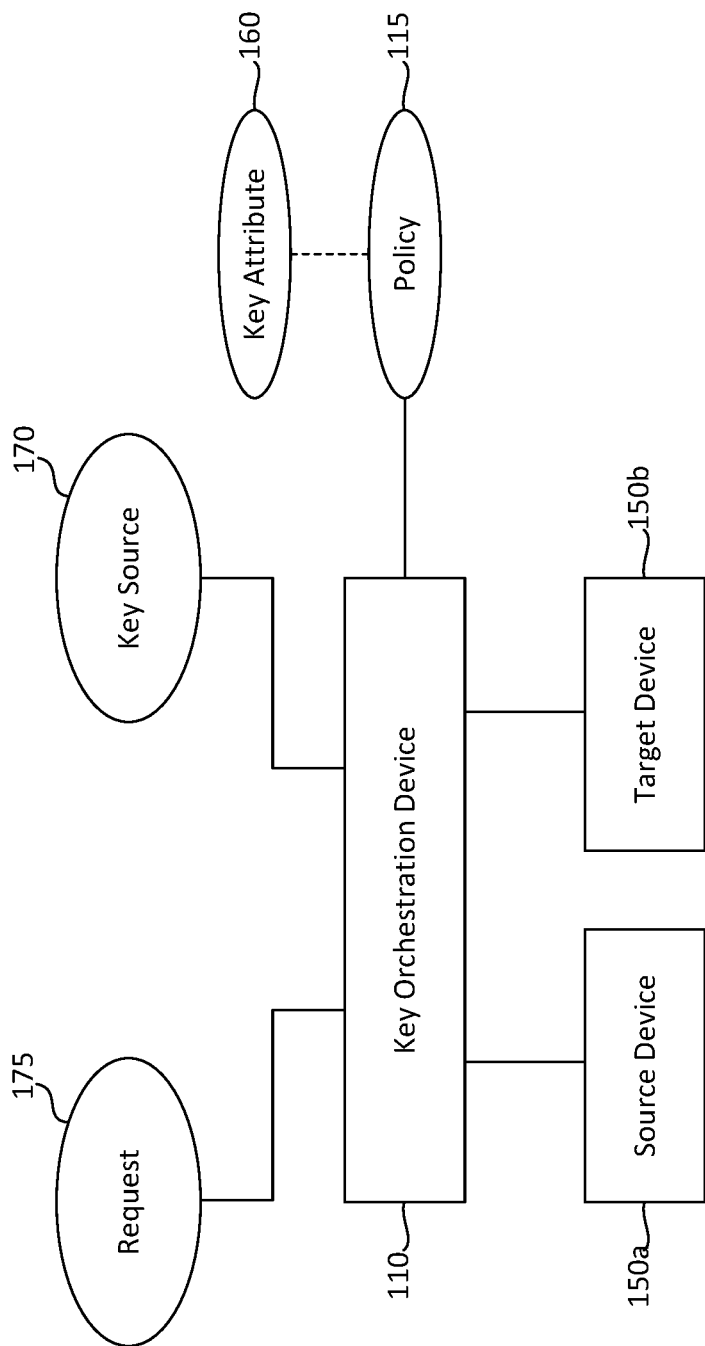
FIG. 1 is a schematic block diagram illustrating an example of a general encryption key orchestration system according to various examples.

In the following description of various examples, reference is made to the accompanying drawings which form a part hereof and in which are shown by way of illustration specific examples in which the examples may be practiced. It is to be understood that other examples may be utilized, and structural changes may be made without departing from the scope of the various examples disclosed in the present disclosure.

Examples described herein generally relate to security object orchestration. The security object orchestration may include management, distribution, and federation of the security object. Security objects may include encryption keys and other sensitive objects (such as, but not limited to, user identity information, certificates, biometric data, random number generator data, determinate random number generator data, non-determinate random number generator data, user authentication information, policy components, other components associated with organization security component, and/or the like). In the present disclosure, encryption key-based orchestration is described in various examples as examples of the security object orchestration systems and methods. It should be appreciated that the orchestration systems and methods are likewise applicable to other security objects, including those described above.

As used herein, "key orchestration" may refer to a combination of key management, key federation, and key distribution activities in one or more enterprises. For example, examples described may be associated with the orchestration of encryption key information correlated with utilizing encryption in the one or more enterprises. "Enterprise key management" may include managing and/or overseeing the multiple uses of asymmetric and symmetric keys required for encrypting data, signing emails, authenticating web services, and/or other potential uses. This may also include encryption management for communications systems to include radio, cellular, satellite and internet protocol based communications. "Enterprise key federation" may include coordinating and negotiating the federation of key information to a plurality of disparate key orchestration platforms (each associated with disparate federating organizations) based on established trust between the federating organizations (e.g., the enterprises). "Key distribution" may refer to a centralized distribution (e.g., pushing or forwarding) of key material to support encryption operations within a local enterprise and/or a foreign enterprise. In particular, key distribution may be concerned with assigning or otherwise transmitting the appropriate encryption keys to an appropriately associated device (e.g., the communication device, which may either be a source device or a target device).

Examples of key orchestration (e.g., a key orchestration device such as a management request handler coupled to a request handler and various supporting databases) may provide control of encryption key management, federation, and distribution through a centralized user interface. Such key orchestration devices may provide centralized systems and/or methods of managing encryption keys associated with communications, infrastructure, and applications. Such key orchestration devices may also manage device enrollment, monitor device health related to encryption capabilities, and monitor status for key orchestration activities. Such capabilities may allow robust transaction reporting to support audit activities associated with communications, application, and infrastructure management.

Key orchestration may be leveraged for additional systems other than the communication systems. Other implementations of key orchestration may include application encryption management, virtualization encryption management, storage encryption management, and/or user identity encryption management. In short, if applications, communications, or infrastructures require use of encryption (or other types of security mechanisms using security objects) and keys (or security objects), orchestration may be applied to provide advantages as described. Communication systems may include, but are not limited to, radio communications, cellular communications, transmission control protocol/internet protocol (TCP/IP) based communications, satellite communications equipment, and the like. Application systems may include, but are not limited to voice-over-internet protocol VOIP applications, virtualization, identification and authentication, messaging, local storage. Infrastructure systems may include, but are not limited to storage solutions, physical security infrastructure, and medical equipment.

In particular examples, a key orchestration device may enable encryption key lifecycle activities across multiple types of communication devices in a centralized manner. The key orchestration device may leverage industry standards for key management for interoperability with existing systems and may use, for example, protocols for applied key management as a part of key orchestration. A distinction between applied key orchestration and key management alone may be demonstrated in encryption key management and key distribution for communication systems. Given the requirement to make new encryption connections before breaking existing connections, typical communication systems cannot utilize rekey commands as it would break communications before management steps are taken to establish new lines of communications. However, rekey commands may work for infrastructure—to include storage, applications and virtualization solutions—where services can be reestablished without loss of centralized control of the managed capability.

The system architecture of key orchestration can be configured to allow for use of a standard-based approach for supported systems such as key management interoperability protocol (KMIP), for example, but also the capability to develop support interfaces for non-standardized systems such as physical security infrastructure, virtualization applications, satellite communications systems, and medical equipment. This may be accomplished by architecturally separating message handling from support interfaces. Using a purely KMIP example, a storage device may receive a "rekey" command, a communication equipment may receive "put-and-notify" commands, and cellular devices may request queued "notify" commands informing the cellular devices to send "get messages" to the key orchestration device to be relayed to key management and generation system components. Example systems implementing such features are discussed below.

Examples described herein may include a key orchestration device to implement centralized, top-down enterprise encryption key management encryption keys (e.g., such as, but not limited to symmetric key encryption, asymmetric key encryption, and the like) as well as other security objects used in security systems. Such centralized, top-down control of encryption may be for a given enterprise. Examples may include implementing coordinated KMIP on enterprise key management, communications systems, applications, and infrastructure for encryption key lifecycle functions implementing at least one of: device registration, user registration, system and user initialization, key material installation, key establishment, key registration, operational use, key storage, key distribution, key update, key recovery, key de-registration, key destruction, key revocation, and the like.

As referred to herein, a "key attribute" (attribute, encryption attribute, and/or the like) associated with an encryption key may refer to a characteristic associated with the encryption key, cryptographic or security characteristics of the encryption key, the cryptographic algorithms of the encryption key, a device generating/transmitting/receiving the encryption key, a user of the device, and/or the like. Each encryption key may be associated with at least one key attribute. The encryption key may be transmitted and/or received with its associated key attributes represented in data values.

As referred to herein, a "policy" may be a rule managing an encryption key based on key attribute(s) associated with that encryption key. In particular examples, a policy may dictate whether the particular encryption key is an acceptable encryption key. Such acceptability may be based on the security and cryptographic considerations as to whether the encryption key (e.g., as shown from the key attributes associated with the encryption key) may be secure enough. In other words, the encryption key generated for a particular communication transaction may be presented for inspection by the policy to be evaluated as to whether the encryption key is to be allowed or denied for that communication transaction.

Some examples include an interface for key orchestration for mobile communication devices (e.g., a wireless device, and/or the like), or provide an interface for key orchestration for radio/satellite communications systems to include telemetry and payload in satellite communications. Particular implementations of the examples may include interfaces for banking applications such as, but not limited to, automated teller machines (ATMs), bank account interfaces, and the like. The interfaces for banking applications may be implemented on any mobile or non-mobile devices. Examples may provide an interface for key orchestration for applications that include virtualization or providing an interface for key orchestration for network infrastructure to include routers, switches, virtual private network (VPN) appliances, firewalls, intrusion detection systems (IDSs), intrusion prevention system (IPSs), tokenizers, and/or the like.

For example, a centralized encryption management may be provided for symmetric encryption keys or asymmetric encryption keys, in both private and/or public contexts. In some examples, existing network infrastructure information may be consumed to distribute encryption keys based on active/inactive status of network infrastructure or distributing and managing encryption keys for network infrastructure based on equipment that can readily accept encryption keys (e.g., existing hardware/software may be installed on the equipment for accepting encryption keys).

Examples may queue encryption key transaction information for communication devices not available at the point of a given encryption management operation (e.g., in a push-key event). In addition, examples described herein may centrally display encryption key lifecycle information (for supported infrastructure) and successful encryption key management transactions. In addition to or as an alternative, failure message and/or a cause of unsuccessful encryption key management transactions may be displayed.

In some examples, a service interface for a communication device to acquire new asymmetric keys on a timed basis may be provided. In addition, a service interface for a communication device to acquire new symmetric keys on a timed basis may be provided. In some examples, a service interface for a communication device to acquire new asymmetric keys on user initiated basis may be provided. In various examples, a service interface for a communication device to acquire new symmetric keys on a user initiated basis may be provided. Also, federated distribution of encryption keys based on established trust based key exchange between two or more key management and orchestration devices may be provided as described.

In some examples, distributing federated symmetric key to local enterprise infrastructure based on configurations for federated symmetric key distribution may be provided. In various examples, distributing federated asymmetric key to local enterprise infrastructure based on configurations for federated asymmetric key distribution may be provided. In addition, implementing federated trust model by using multiple devices and split key distribution may be provided to establish trust between two untrusted entities that need to communicate securely.

The key orchestration device (e.g., the management request handler and associated components) may include sub-modules including a business logic module, authentication and authorization module, policy enforcement module, system consistency/validation module, and/or the like for performing functions described herein.

FIG. 1 is a schematic diagram of an example of a general encryption key orchestration system 100 as implemented in various examples. In various examples, a key orchestration device 110 may be coupled to at least one source device 150*a* and at least one target device 150*b*. The key orchestration device 110 may comprise at least one desktop computer, mainframe computer, laptop computer, pad device, smart phone device or the like, configured with hardware and software to perform operations described herein. For example, the key orchestration device 110 may comprise computation systems having suitable processing capabilities, memory, user interface (e.g., display and input) capabilities, and communication capabilities configured with suitable software to perform operations described herein. Thus, particular examples may be implemented, using processor devices that are often already present in many business and organization environments, by configuring such devices with suitable software processes described herein. Accordingly, such examples may be implemented with minimal additional hardware costs. However, other examples of the key orchestration device 110 may relate to systems and processes that are implemented with dedicated device hardware/devices specifically configured for performing operations described herein.

Generally, the source device 150*a* may be a communication device transmitting data (or initiating communication) for which encryption (and therefore an encryption key) may be required or preferred. The target device 150*b* may be a communication device for receiving data that may have been encrypted (e.g., with an encryption key). According to various examples, the source device 150*a* and/or the target device 150*b* may be an ATM. The source device 150*a* and/or the target device 150*b* may also be any server or device for storing bank account information and executing banking functions. In particular examples, each of the source device 150*a* and the target device 150*b* may include a mobile smart phone (such as, but not limited to an iPhone™, an Android™ phone, or the like) or other wireless mobile communication devices with suitable processing and encryption capabilities. Typical modern mobile communication devices include telephone communication electronics as well as some processor electronics, one or more display devices and a keypad and/or other user input device. In further examples, each of the source device 150*a* and the target device 150*b* may comprise any suitable type of mobile phone and/or other type of portable electronic communication device, such as, but not limited to, an electronic smart pad device (such as, but not limited to an iPad™), a portable computer, or the like. It should be noted that an encryption key may originate from the source device 150*a* or the target device 150*b*, and/or both. In other words, either of the source device 150*a* or the target device 150*b* may be a key source 170. The source device 150*a* and the target device 150*b* may be associated with a same enterprise or separate enterprises. In other examples, one or both of the source device 150*a* and the target device 150*b* may be a wired device suitable for communication with a wired or wireless device.

In some examples, the key orchestration device 110 may be a part of the enterprise associated with the source device 150*a* and target device 150*b*. An enterprise may be an organization or security unit having dominance over at least one source device 150*a* and/or target device 150*b*. With respect to communication between the source device 150*a* and the target device 150*b* associated with disparate enterprises, the source device 150*a* may be associated with a first enterprise and the target device 150*b* may be associated with a second disparate enterprise. An enterprise may be a company, subgroup within a company, autonomous and independent entity, a communication group, security provider, various entities, organizations, and/or the like. Each key orchestration device 110 may perform key orchestration activities for a plurality of devices such as the source device 150a and the target devices 150b, establishing a hierarchical model for key orchestration.

In other examples, the key orchestration device 110 may be a third party server coupled to the enterprise associated with the source device 150a and/or target device 150b. Thus, various examples may affect centralization of encryption key orchestration with existing communication systems and protocols of the enterprise. In other words, the key orchestration device 110 may be implemented to cooperate with the existing encryption technology for communications, applications, and infrastructure. Key orchestration (e.g., by a third party or otherwise) may interact with both the sources and targets of key information (e.g., the encryption key and the associated key attributes 160). Accordingly, a top-down control of key orchestration may be achieved, while maintaining a request model in which the source device 150a and the target device 150b may request key information.

In some examples, a key source 170 may be coupled to the key orchestration device 110. The key source 170 may be any source by which an encryption key (or any other types of security objects) may be generated. In some examples, the key source 170 may be a part of the key orchestration device 110 (e.g., a module or database within the key orchestration device 110 or coupled to the key orchestration device 110). In other examples, the key source 170 may be a source external to the key orchestration device 110. The key source 170 may include the source device 150a and/or the target device 150b, one or more of which may be capable of generating encryption keys for the communication therebetween. Alternatively or additionally, the key source 170 may be a key-generating device (other than the source device 150a and the target device 150b) internal or external to the same enterprise as the source device 150a and/or the target device 150b. In these cases, the key source 170 may be an existing specialized key generating device implemented separately from the key orchestration device 110 (e.g., the key generation and management device 230 of FIG. 2). Other examples of the key source 170 may include a management user interface 220 of FIG. 2 (e.g., encryption keys may be generated manually through the management user interface 220), a key federation interface 260 of FIG. 2 (e.g., encryption keys generated from a disparate enterprise), various databases storing generated encryption keys, and/or the like.

In various examples, a request 175 may be sent to the key orchestration device 110. The request 175 may be a request to generate an encryption key. For example, the key orchestration device 110 may itself generate (or retrieve from a database coupled to the key orchestration device 110) encryption keys in response to the request 175. In other examples, the key orchestration device 110 may request an encryption key from other devices (e.g., the key source 170) within the same or a disparate enterprise.

The request 175 may originate from the source device 150a, the target device 150b, the key orchestration device itself 110, a third-party device within the same enterprise (e.g., the management user interface 220, the key management interface 240, and the like), a third-party device in a disparate enterprise (e.g., from the key federation interface 260 of FIG. 2), and/or the like. Examples of the key orchestration device 110 may therefore serve as an intermediary device between the source device 150a, the target device 150b, the requesting device (which issues the request 175), the key source 170, and/or the like. Accordingly, key management, distribution, and federation may effectively be managed for various devices in a same or disparate enterprise.

Various components within the general encryption key orchestration system 100 (e.g., the key orchestration device 110, the source device 150a, the target device 150b, the key orchestration device itself 110, the device that issues the request 175, the key source 170, and/or the like) may be connected via any suitable wired or wireless network. The network may be secured or unsecured. For example, the network may be a wide area communication network, such as, but not limited to, the internet, or one or more intranets, local area networks (LANs), ethernet networks, metropolitan area networks (MANs), a wide area network (WAN), combinations thereof, or the like. In particular examples, the network may represent one or more secure networks configured with suitable security features, such as, but not limited to firewalls, encryption, or other software or hardware configurations that inhibits access to network communications by unauthorized personnel or entities.

In some examples, key attributes 160 may refer generally to characteristics associated with the encryption key itself, characteristics of a device associated with the encryption key, and/or the like. In other words, the key attributes 160 may refer to when, where, how, for what, with what device the encryption key has been or is about to be generated. Examples of the key attributes 160 may include, but not limited to, encryption key size, a classification of the encryption key, a time at which the encryption key has been or about to be generated (e.g., by the key source 170), a location in which the encryption key has been or about to be generated (e.g., by the key source 170), a role associated with the key source 170, a role associated with the source device 150a, a role associated with the target device 150b, a role associated with a key generating/storage device, a role associated with a user of the source device 150a, the target device 150b, the key generating/storage device, the source 170, a combination thereof, and/or the like.

In some examples, the key attributes 160 may include the key size. Typically, the larger the key size (i.e., the longer the encryption key), the more security it may provide for the communication. The key attributes 160 may also include the classification of the encryption key. In various examples, the classification of the encryption key may refer to its utilization e.g., what the encryption key may be used for. Examples of the utilization may include (e.g., for communication systems) whether an encryption key is a global hopping key, whether the encryption key is a secret key, whether the encryption key is symmetrical or asymmetrical, a combination thereof, and/or the like.

In some examples, the key attributes 160 may include a time and/or location at which the encryption key has been or about to be generated. As described, the time and/or location at which the encryption key may be generated may be defined from the perspective of the source device 150a, the target device 150b, and/or any other key sources 170. For example, when an encryption key is generated (and/or sent, received), a corresponding time of the device (e.g., the key sources 170) generating (and/or sending, receiving) the encryption key may be determined. The encryption key may be transmitted/stored with a time stamp representing the time. Similarly, when an encryption key is generated (and/or sent, received), a corresponding geo-location of the device (e.g., the key sources 170) generating (and/or sending, receiving) the encryption key may be determined. The encryption key may be transmitted/stored with the geo-location.

In various examples, the key attributes 160 may include role(s) associated the source device 150a, the target device 150b, the key source 170, the other key generating/storage device, as well as their associated user. Particularly, a role may refer to a group/classification (e.g., based on predefined assignment, time, geo-location of the device, whether the device is generating encryption keys, whether the device is transmitting the encryption key, whether the device is receiving the encryption keys, and/or the like) in which the device/user is assigned to, a level of security clearance, the type of the device/user, a combination thereof, and/or the like. In particular examples, each device/user may be associated with at least a security group (e.g., assigned to a server). Within each security group, subgroups may exist to further subdivide the devices/users. The groups/subgroups may be predetermined by any suitable personnel. In other or further examples, the groups/subgroups may be defined when the encryption key is generated (e.g., based on current characteristics of the device such as geo-location, time of the day, and/or the like).

It should be appreciated by one of ordinary skill in the art that one or more key attributes 160 may be associated with a given encryption key. In fact, as implemented in various examples, an encryption key may be associated with a plurality of key attributes 160. The encryption key may be transmitted along with the associated key attributes 160 to a device (e.g., the key orchestration device 110). The encryption key and the key attributes 160 associated with the encryption key may be inspected according to at least one policy related to the key attributes 160. Such process may be referred to as "shooting" the key attributes 160 against the relevant policies or "presenting" the key attributes 160 for "inspection" by the policy.

The encryption keys may generally be managed by a set of policies 115. As implemented in various examples, a policy may refer to at least one defined rules governing the criteria for the key attributes 160. In some examples, a policy engine (e.g., as embedded in the key orchestration device 110 and/or other devices as described herein) may receive the encryption key and the key attributes 160 associated with the encryption key as input. The policy engine may output a response as to whether the encryption key may be allowable based on the key attributes 160. In particular examples, the policy engine may output a binary response (e.g., accepted or denied).

The encryption key and the associated key attributes 160 may be presented for inspection one or more times per communication transaction. In some examples, the encryption key and the associated key attributes 160 may only be required to be presented for inspection by policy 115 once per communication transaction (e.g., at the initiation stage before the communication transaction has taken place but after the encryption key has been generated). In other or further examples, the encryption key and the associated key attributes 160 may be required to be presented for inspection by the policies 115 periodically and/or every time the encryption key has been altered for a given communication transaction. In some case several encryption keys may be presented for inspection by the policies 115 for a given communication transaction.

The policy engine may identify the key attributes 160 received. The policy engine may retrieve relevant policy 115 from a local or remote storage database. In other examples, the policy engine may inspect particular key attributes 160 (or sometimes all key attributes 160) associated with the encryption key as the policy engine determines acceptability based on the predefined set of policies 115. For example, the policy engine may determine, based on the relevant policy 115, whether the encryption key should be accepted for the communication transaction for which the encryption key may be generated.

In one non-limiting example, the policies 115 may dictate that a size of the encryption key must be within a predetermined range (e.g., the size of the encryption key must exceed and/or be below 128 bits, 192 bits, 256 bits, and/or the like). In some cases, the policy 115 may dictate that the size of the encryption keys must be a particular key size (e.g., 256-bit, and/or the like).

The policies 115 may require that the geo-location attribute of the key attributes 160 to be associated with (or not associated with) a predetermined location and/or within (or not within) a predetermined area. For example, when the geo-location attribute of the encryption key (e.g., as defined by the geo-location of the generating, transmitting, and/or receiving device of the encryption key) is associated with a "danger" zone, the policy engine may deny the encryption key. This is because there may be a high likelihood that the encryption key may be compromised in the danger zone. On the other hand, when the geo-location attribute of the encryption key is associated with a "safe" zone, then the encryption key may be allowed for the communication transaction. This is because there may be at most a low likelihood of comprised security keys. In further examples, a "neutral" zone may be a safe zone, or, in the alternative, a zone associated with an intermediate likelihood of comprised security keys.

In another non-limiting example, the policies 115 may require the time attribute of the key attributes 160 to be within (or not within) a predetermined time period. The policy 115 may deny the encryption key on the basis that the time attribute (e.g., a time stamp) associated with the creation, transmission, and/or reception of the encryption key may be outside of a predetermined time period (for example, at 3:00 am, where acceptable creation, transmission, and/or reception time of the encryption key may be between 9:00 am-5:00 pm).

In various examples, the policies 115 may allow the encryption key, when the role attribute of the key attributes 160 is associated with the encryption key generating/transmitting/receiving device (and the device's associated user) is within a predetermined accepted group. In some examples, the source device 150a (the target device 150b or other source devices 170) associated with a first security group within an enterprise may generate an encryption key and present the encryption key for inspection by the policy 115. The policy engine may determine whether the first security group may be a part of the accepted group. When the policy engine determined that the source device 150a (the target device 150b or other source devices 170) is a part of the accepted group (e.g., the first security group falls within the accepted group), the encryption key may be allowed for the communication transaction for which the encryption has been created for.

It should be appreciated by one of ordinary skill in the art that a plurality of policies 115 may act in concert for a comprehensive encryption key management scheme. This means that, the plurality of policies 115, each of which may regulate at least one disparate key attribute 160, may be aggregated into a set of policies 115 for regulating encryption keys presented to the policy engine.

In other examples, other key sources 170 (e.g., other than the source device 150a and the target device 150b) may generate an encryption key to be distributed (or pushed) to the source device 150a and/or the target device 150b for a communication transaction between those devices. The policy engine (e.g., the key orchestration device 110) may inspect the key attributes 160 to determine whether the encryption key is allowable. In response to the encryption key being determined to be allowable, the key orchestration device 110 may determine to distribute the encryption key to the source device 150a and/or the target device 150b for the communication transaction.

In various examples, when the policy engine denies the encryption key, the policy engine may transmit a rejection indicator (e.g., a "denied" message) to the key source 170. The key generating device may redesign a second encryption key to be presented (along with the key attributes 160 associated with the second encryption key) to the policy engine for a second round of inspection. In other examples, when the policy engine denies the encryption key, the policy engine may transmit a "denied" message to the key source 170 along with a cause of failure (e.g., a hint) as to which the key attribute 160 caused the denial and/or what it should be.

For example, an encryption key with key attributes 160 including a time attribute of 4:49 am, geo-location attribute of "safe zone," and role attribute of "security group A" may be presented to a set of policies 115. The policy engine may allow the encryption key when the encryption key is generated between 5:00 a.m.-9:00 p.m., in either a "safe zone" or a "neutral zone," and for security groups A-C. Such encryption key may be denied, given that it is not generated between 5:00 a.m.-9:00 p.m. The policy engine may transmit the "denied" message along with a time attribute hint (e.g., to generate the encryption key after 5:00 a.m., in 11 minutes).

Accordingly, the key orchestration device 110 may be configured to manage encryption keys and distribute the encryption keys. In other words, the key orchestration device 110 may serve as an intermediary between the source devices 150a, the target devices 150b, other key sources 170, and/or the like as these devices themselves may lack the capability to distribute and manage encryptions in the manner set forth with respect to the key orchestration device 110. The key orchestration device 110 may include a plurality of modules (or may be coupled to remote modules) for each feature as described herein. In addition, the general encryption key orchestration system 100 may be coupled with at least one other similar general encryption key orchestration system 100 to make up the encryption key federation scheme as described herein.

Figure 2:
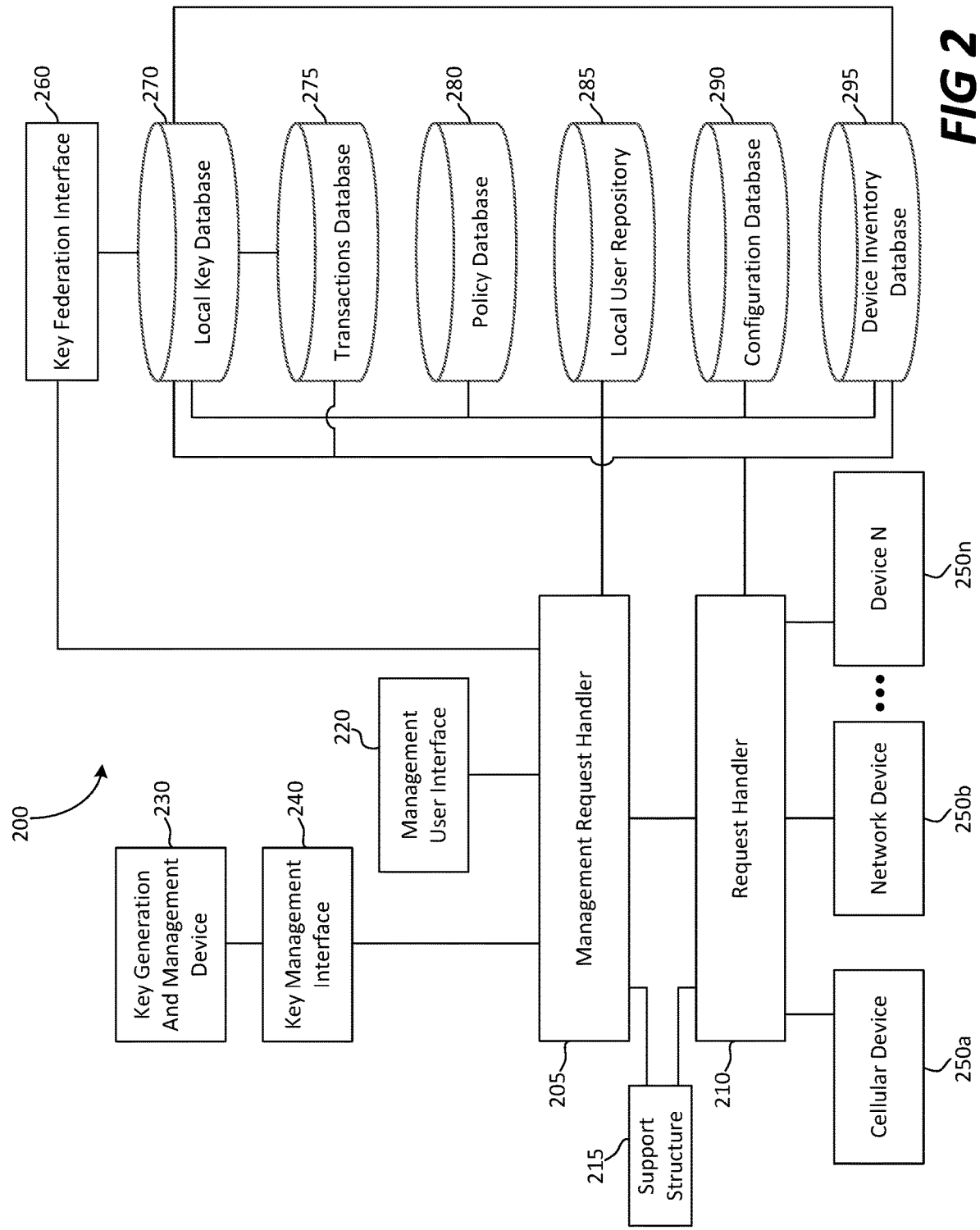
FIG. 2 is a schematic block diagram illustrating an example of an encryption key orchestration system according to various examples.

FIG. 2 is schematic diagram illustrating an example of an encryption key orchestration system 200 according to various examples. In some examples, the encryption key orchestration system 200 may illustrate a particularized implementation of the general encryption key orchestration system 100. From an architectural perspective, examples as illustrated for the encryption key orchestration system 200 may be centered around message handling and interoperability with key generation technology, other key orchestration devices, supported communications systems, applications, and infrastructure.

The key orchestration device 110 may include at least a management request handler 205, a request handler 210, a support structure 215, a key federation interface 260, as well as the associated databases (e.g., a local key database 270, transactions database 275, policy database 280, local user repository 285, configuration database 290, device inventory database 295).

In various examples, the management request handler 205 may include (or is) the policy engine that may be implemented for policy-based encryption key management, distribution, and federation. As the management request handler 205 can be an intermediary layer between the various components described, rapid integration of the policy-based encryption key management, distribution, and federation may be added to an existing system without having to make changes to the system level message handling. The management request handler 205 may provide a top-down management for various communication devices (e.g., a cellular device 250a, a network device 250b, . . . , a device N 250n, and/or the like) associated with a given enterprise. In various examples, each of the cellular device 250a, the network device 250b, . . . , and the device N 250n may be the source device 150a or the target device 150b depending on the particular communication transaction for which the encryption key is generated.

The management request handler 205 and the request handler 210 may be of an agent-interface relationship. That is, the request handler 210 may serve as the interface between the management request handler 205 and the various communication devices associated with the enterprise (e.g., the cellular device 250a, the network device 250b, . . . , the device N 250n, and/or the like). The communication between the management request handler 205 and the request handler 210 may be facilitated by the support structure 215. The support structure 215 may provide suitable communication protocol, management application, infrastructure, communication application program interface (API), configurations, translations, and/or the like for interfacing between the management request handler 205 and the request handler 210.

The request handler 210 may receive key generating requests 175 and/or encryption keys from the various communication devices and relate them to the management request handler 205 with the assistance from the support structure 215. The request handler 210 may also relate the response of the management request handler 205 (including the hint in some examples) and/or encryption keys to the various communication devices with the assistance from the support structure 215.

In various examples, the management request handler 205 may receive the request 175 for generating an encryption key. Various components may be capable of transmitting the request 175 to the management request handler 205. The some examples, the management request handler 205 may receive the request 175 from the various communication devices associated with the enterprise (e.g., the cellular device 250a, network device 250b, . . . , device N 250n, and/or the like). The request 175 may be related by the request handler 210, which may serve as the interface between the devices and the management request handler as described. The key federation interface 260, the management user interface 220, and the key management interface 240 may also transmit the request 175 to the management request handler.

In non-request-driven examples, the management request handler 205 may receive encryption keys from at least one key source 170. The key source 170 may be the key generation and management device 230, which may be any suitable existing encryption key generating apparatus implemented within the enterprise. In other words, the key generation and management device 230 may represent any existing schemes internal or external to the communication systems of the enterprise. For example, the key generation and management device 230 may be any suitable native protocol associated with safe net equipment.

Examples of the key management interface 240 may represent an internal integration of key generation and key management capabilities as well as an external interface with existing solutions. This is because the key management interface 240 may be poised between the key generation and management device 230 (which may generate encryption keys) and the management request handler 205 (which inspects key attributes 160 of the encryption keys based on policies 115). For example, the key management interface 240 may be a translation interface that maintains a standard encryption management messaging language with the key orchestration device 110. This can allow enterprise interoperability between existing solutions (e.g., the key generation and management device 230) and the key orchestration platform (e.g., the management request handler 205). Accordingly, the policy-based encryption key orchestration systems and methods may be implemented with various types of security object (e.g., encryption key) generation protocols.

Additionally or alternatively, in request-driven examples, the management user interface 220 may transmit the request 175 to the management request handler 210. The management user interface 220 may utilize the same API as other components described herein to assure interoperability. The management user interface 220 may include suitable user input and display devices to receive and display data to a designated managing user. In particular examples, the management user interface 220 may include a mobile device such as a smartphone or a tablet. The management user interface 220 may also include a wired device.

In some examples, the key federation interface 260 may transmit the request 175 to the management request handler 205. The key federation interface 260 may be in communication with a second key federation interface (such as, but not limited to, the key federation interface 260) associated with a disparate enterprise (which may utilize the same or similar key orchestration systems and methods described). When one of the various communication devices (e.g., the cellular device 250a, network device 250b, . . . , device N 250n, and/or the like) wishes communicate with another device from the disparate enterprise (or vice versa), the request 175 may be transmitted (from the key federation interface 260 of the second enterprise) to the key federation interface 260 of the current enterprise. In some examples, the request 175 may be directly transmitted to the management request handler 205 when the key federation interface 260 has designated the relationship between the enterprises to be trusted.

In some examples, instead of or in addition to the request 175, encryption keys as well as the "allowed" and "denied" messages may be transmitted and received between the key federation interface 260 (of the current and the second enterprise). The encryption key and its associated attributes 160 may be stored in the local key database 270, which may be accessible by the management request handler 205 (for policy inspection) and/or the request handler 210 (for distribution).

The request 175 may be transmitted with further instructions related to generating the encryption key. The further instructions include, but are not limited to, a source of encryption keys, the encryption keys themselves, key attributes 160 associated with the encryption keys, and/or the like.

In various examples, in response to receiving the request 175, the management request handler 205 may generate or facilitate the generation of the encryption key. For example, where the request 175 may be silent as to where the encryption key is to be generated (e.g., the key source 170), the management request handler 205 itself may generate the encryption key. The management request handler 205 may generate the encryption key based on the set of policies 115 stored in the policy database 280. In other words, the management request handler 205 may generate the encryption keys with key attributes 160 that would not have violated any policies 115 set forth in the policy database 280.

Where the request 175 may be silent as to where the encryption key is to be generated (e.g., the key source 170), or specifies that a particular key source 170 to generate the encryption key, the management request handler 205 may retrieve or otherwise request the encryption key from a suitable key source 170. The management request handler 205 may request encryption keys from the management user interface 220, the key federation interface 260, the communication devices (e.g., the cellular device 250a, network device 250b, . . . , device N 250n, source device 150a, and target device 150b), key management interface 240, and/or the like.

The management request handler 205 may retrieve encryption keys from a designated database storing encryption keys (e.g., the local key database 270). The local key database 270 may be coupled to other key sources 170 (e.g., the cellular device 250a, network device 250b, . . . , device N 250n, source device 150a, target device 150b, the key generation and management device 230 the key federation interface 260, and/or the like) and store cached encryption keys on behalf of the other key sources 170. The management request handler 205 may retrieve encryption keys from the local key database 270 instead of requesting encryption keys from the key sources 170. This is so that transaction time for retrieving/generating the encryption key may be improved, and that network problems would not hinder the ability of the management request handler 205 to obtain encryption keys, given that the local key database may be local to (e.g., residing on a same network node) the management request handler 205. As the management request handler 205 is retrieving encryption keys from the local key database 270, a verification request may be sent to the key source 170 to ensure whether the encryption key to be retrieved has been altered by the key source 170. A confirmation or an updated encryption key may be sent to the local key database 270 in response, so that the management request handler 205 may accordingly receive the encryption key.

In some examples, the management request handler 205, upon receiving encryption keys (whether requested or not) in any manner as described, may cache the encryption key along with the key source identifier and the associated key attributes 160 at the local key database 270. The encryption key, the key source identifier, and the key attributes 160 may be stored in case that the communication is lost or when the encryption key source of the encryption key is not authoritative. Whereas in some examples, the encryption key may not be transmitted with the key attributes 160. In such examples, the management request handler 205 may determine the key attributes 160 from various sources such as, but not limited to, the local user repository 285, the device inventory database 295, and/or the like.

The management request handler 205 may then inspect the key attributes 160 associated with the encryption key received based on the set of policies 115 stored in the policy database 280. The management request handler 205 may retrieve all policies 115 or only the relevant policies (e.g., based on some or all key attributes 160) from the policy database 280. In some examples, the encryption keys generated by the management request handler 205 itself or at the direction of the management request handler 205 may be spared from inspection by policies 115 when they are created based on the policies 115. In other examples, all encryption keys generated by the management request handler 205 or at the direction of the management request handler 205 may be inspected by the policies 115. Encryption keys allowable based on the policies 115 may be allowed while unacceptable encryption keys may be denied, in the manner described. The management request handler 205 may be configured to update or add policies stored in the policy database 280 (e.g., as directed by the management user interface 220).

The local user repository 285 may be a database storing information related to local users of the communication devices (e.g., the cellular device 250*a*, network device 250*b*, device N 250*n*, and/or the like) within the enterprise. In various examples, the local user repository 285 may store characteristics/information of the users that would constitute key attributes 160. The characteristics include, but not limited to, privileges, security groups, assigned roles, a combination thereof, and/or the like. The security groups may be stored in a hierarchical tree. The management request handler 205 may access the local user repository 285 for such characteristics and utilize them as key attributes 160 associated with encryption keys requested, transmitted, or received by that device corresponding to such characteristics. The management request handler 205 may add or alter information stored in the local user repository 285. A copy of the information stored in the local user repository 285 may be sent to the local key database 270 as key attributes 160 to be stored in the local key database 270.

In some examples, the transaction database 275 may store various communication transactions or potential communication transactions. In some examples, the transaction database 275 may store encryption key transmission instances (i.e., instances where encryption keys are to be distributed) to one or more devices. For example, when a particular encryption key cannot/should not be forwarded (e.g., pushed to a communication device) for any reason, the forwarding transaction (e.g., a job) may be queued or otherwise stored within the transactions database 275 for forwarding the encryption key at a later some. The transaction database 275 may also store a status of each particular encryption key transmission instance, which may later be read by the request handler 210. For example, the request handler 210 may at a later time attempt to transmit all or some encryption keys to corresponding communication devices for all "unsent" encryption key transmission instances. The transactions database 275 may be coupled to the local key database 270 to gain access of the keys to be forwarded to each communication device that the encryption key may be generated for.

In further examples, the transaction database 275 may be coupled to the request handler 210 and may store the communication transactions (for which the encryption key may be requested, transmitted, or received) and/or the associated key attributes 160. For example, the request handler 210 may transmit such information to the transactions database 275. The transaction database 275 may be coupled to the local key database 270. The communication transactions (as the associated details) may be associated with the encryption keys stored in the local key database 270. The management request handler 205 may need to access only the local key database 270 for the encryption keys and the associated key attributes 260.

The configuration database 290 may store supporting instructions for the key encryption key orchestration system 200. In some examples, the configuration database 290 may store internal network, configuration of clients, configuration of applications, IP address allocations, various component configurations, device privileges, device communication pathways, credentials, and/or the like. The configuration database 290 may be coupled to the management request handler 205, which may require the instructions stored within the configuration database 290 for operations. The management request handler 205 may also add or alter the information stored in the configuration database 290.

In some examples, the device inventory database 295 may store information related to the communication devices associated with the given enterprise. For example, information stored may include, but not limited to, security group, security level, geo-location, identification number, internal classification, device specifications, time stamp in which an encryption has been created, a combination thereof, and/or the like. The request handler 210 may be coupled to the device inventory database 295 to store such data therein. The management request handler 205 may be coupled to the device inventory database 295 for accessing such device information. The device inventory database 295 for associating particular cached keys with the corresponding device information as key attributes 160. A copy of the information stored in the device inventory database 295 may be sent to the local key database 270 as key attributes 160.

The key federation interface 260 may allow one key orchestration device 110 to federate encryption key information with one or more other key orchestration devices 110 (through their associated respective key federation interfaces 260) based on an established trust relationship. Each enterprise may include by a key orchestration device 110. As such, the key federation interface 260 may maintain a trust relationship with the communication systems of at least one other enterprise. It is, in other words, a gateway to extend trust.

Figure 2A:
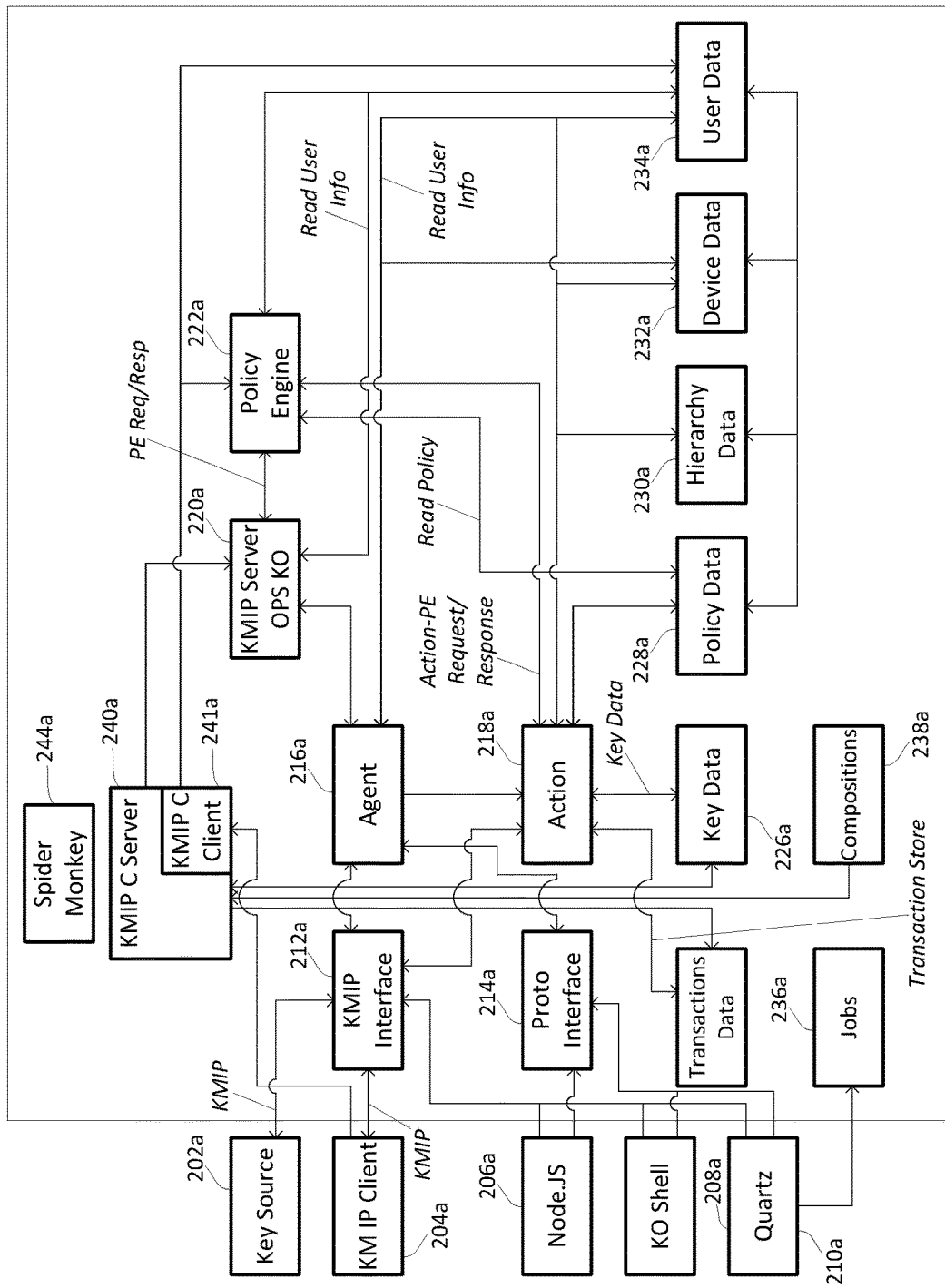
FIG. 2A is a schematic block diagram illustrating an example of an encryption key orchestration system according to various examples.

In some examples, various examples described herein may be implemented with the systems set forth in FIG. 2A. FIG. 2A is a schematic block diagram illustrating an example of an encryption key orchestration system 200*a* or a key orchestration appliance according to various examples. Referring to FIGS. 1-2A, the encryption key orchestration system 200*a* corresponds to the key orchestration class model and applies the same toward solving technical problems by building a key orchestration application. The encryption key orchestration system 200*a* may correspond to the key orchestration device 110.

In some examples, a Quartz 210*a* may handle creation and management of composite jobs for the encryption key orchestration system 200*a*, including but not limited to key orchestration administration, user/device administration, key distribution, key management, key federation, and the like. Job control may be made aware of overall application state and interacts with a policy engine 222*a* for policy checks for broad compliance with job creation. The Quartz 210*a* may facilitate management of job objects, which represent a composite set of actions for key management, key orchestration application management, user/device management, and/or the like in light of those functions. The Quartz 210*a* may have a connection with the policy engine 222*a* for policy checks associated with composite functions. The job objects may be created by a job control module

236a. Job objects may be associated with atomic transactions. Atomic transactions created by the job control module 236a can be inspected by the policy engine 222a to pre-validate a job before running the job.

The encryption key orchestration system 200a may include an action module 218a, which represents atomic transactions for key orchestration administration, user/device administration, key distribution, key management, key federation, or the like. Transactions interact with the policy engine 222a for inspection of actions as they are occurring for policy compliance at the point of the transaction being executed.

The encryption key orchestration system 200a may include an agent 216a, which may represent a programmatic interface that can invoke other functions within the encryption key orchestration system 200a. The agent 216a itself may be a plugin type architecture that allows for plugin components to be implemented per invocation. This may resemble a factory design pattern.

The policy engine 222a may provide an interface to determine if job control, jobs, or transactions are compliant with defined policy. The policy engine 222a may consume user defined policy and exposes the policy as a series of compliance statements and default values.

In some examples, a KMIP C Server 240a may be a library that provides for a KMIP interface provided by Cryptsoft. The KMIP C Server 240a may operably coupled to a spider monkey 244a, which may be a library that allows the encryption key orchestration system 200a to interact with the KMIP C Server 240a to allow for server-side execution of Java Script. The KMIP C Server 240a may include a KMIP C Client 241a for interfacing with the KMIP client 204a. A KMIP Server OPS KO 220a may provide a key orchestration-specific extension of the KMIP C Server that ties all KMIP operations into actions that are evaluated by policy In some examples, a key source 202a may represent sources of key information such as a Hardware Security Module (HSM), a KMIP-enabled key management server, or the like. The key source 202a can also represent key messages (for elements beyond KMIP register). The key source 202a may correspond to the key source 170. A KMIP client 204a may represent users and/or devices that use the KMIP protocols. The KMIP client 204a may be a key orchestration daemon, key orchestration service, or another device that uses the KMIP protocols. The key source 202a and the KMIP client 204a may be external to the encryption key orchestration system 200a.

The encryption key orchestration system 200a may include interfaces such as, but not limited to, a KMIP interface 212a, proto interface 214a, or the like. Much like the agent 216a, each interface may be a plugin implementation that provides a channel for sending and/or receiving key management, distribution, and federation type of communications between the encryption key orchestration system 200a with the key source 202a and/or the KMIP client 204a. The encryption key orchestration system 200a may maintain records of available interfaces through data model. The key source 202a and the KMIP client 204a may communicate with the KMIP interface 212a using KMIP standards. The KMIP interface 212a may call OpenSSL.

In some examples, transaction data 224a may represents data access objects for transactions. Specifically, the transaction data 224a tracks composite jobs and atomic transactions that are in progress and that are completed. The transaction data 224a can be used to recover a job if a transaction fails for some reason and recovery is defined as an option in policy.

Key data 226a may represent data for keys that are both locally stored or locally referenced\remotely stored. The key data 226a may also be tied to attributes associated with the key data. Policy data 228a may represent the storage of the policy Document Security language (DSL), represented as chunks of Extensive Markup Language (XML) that is constructed in the policy engine 222a based on what part of the hierarchy that a job is being executed on.

Hierarchy data 230a may represent the structural organization of control for encryption key orchestration system 200a. Hierarchy nodes are associated with one or more user\devices, one or more key sources and defined policy. Administrative users are also associated with the Hierarchy. From a source\device perspective, the policy data 228a and the hierarchy data 230a can be "looked up" to have inheritance. A hierarchy node can exist without anything being assigned to it.

In some examples, device data 232a may be needed to identify a creator or consumer of key information and contact the creator or consumer of information. The device data 232a may include attributes associated with devices, such as the source device 150a and/or the target device 150b. In some examples, user data 234a may include information on administrative users. The user data 234a may have a normalized relationship with the device data 232a and hierarchy data 230a. Compositions 238a may include executable Java Script associated with complex key management operations.

In some examples, the encryption key orchestration system 200a may include a rest API. Much like an interface that can invoke key orchestration functions, the rest API can allow for external applications to invoke the key orchestration functions with information required to create, read, execute, update, or maybe even delete a key orchestration job. The rest API can leverage the KMIP interface 212a and proto interface 214a to invoke the agent 216a that executes actions associated with operating the encryption key orchestration system 200a. The rest API can be operably coupled to a Node.JS 206a. An admin user interface may use the rest API. In some examples, a KO shell 208a may be a console interface that uses the KMIP interface 212a and proto interface 214a to invoke the agent 216a that executes actions associated with the encryption key orchestration system 200a.

From an interface perspective, a file driver is no different than any other user\device key orchestration Daemon\Service as one or more of KMIP, classX (as a secondary messaging protocol), and the like are used. The file driver may be a kernel module (character device driver) that represents a certificate or other key file to the host operating system for simpler integration. Other clients may represent other interfaces that encryption key orchestration system 200a can use, including customer-specific solutions or other standards such as PKCS 11 or HSM wire protocols.

Figure 3:
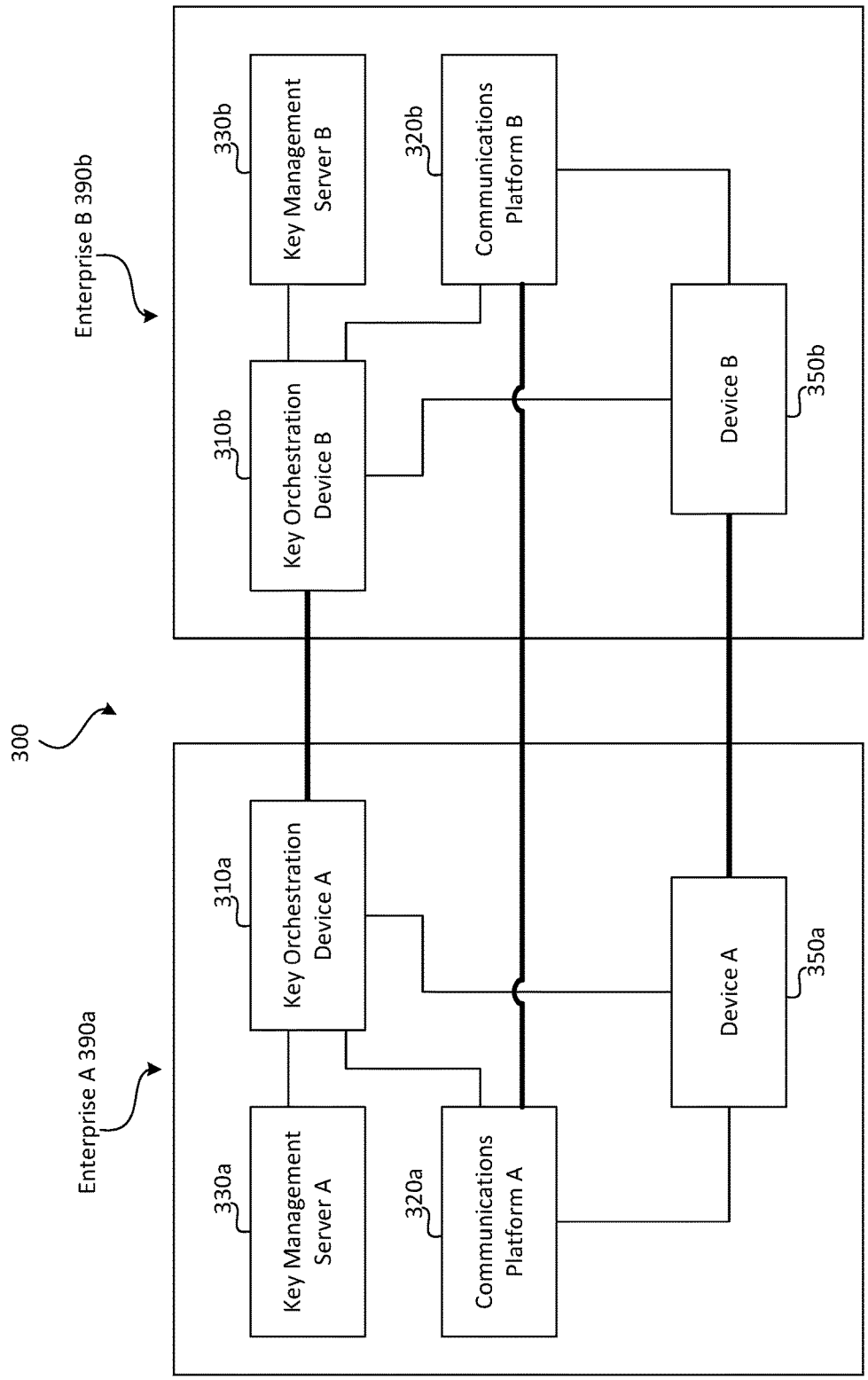
FIG. 3 is a schematic block diagram illustrating an example of an encryption key federation system as implemented in various examples.

FIG. 3 illustrates an example of an encryption key federation system 300 as implemented in various examples. The key federation system 300 may implement the key orchestration device 110 as set forth with respect to FIGS. 1-2. The key federation system 300 may be based on extra-enterprise communication relationship and key federation enabled by the key orchestration device 110 (e.g., the management request handler 205 and the associated components).

Encryption keys (e.g., asymmetric encryption keys, symmetric encryption keys, and/or the like) generated by components within one enterprise (e.g., enterprise A 390a) may be distributed to a disparate key orchestration device (e.g., the key orchestration device 110, the management request handler 205, and its associated components, and/or the like) of another enterprise (e.g., enterprise B 390b) pursuant to inspection by the policies 115 of either (or both) enterprises. This can enable secured communications or data exchange with outside entities (e.g., enterprises) based on the federated trust model. This can also allow encryption management to parallel communications management in supporting external communications to enable symmetric key encryption for communications. Accordingly, performance of the communications platform may be improved, given that utilization of asymmetric encryption may be expensive from a processing perspective as compared to symmetric encryption.

In the key federation system 300, each enterprise (e.g., the enterprise A 390a or the enterprise B 390b) may be associated with a respective one of a key orchestration device A 310a and a key orchestration device B 310b). Each of the key orchestration device A 310a and the key orchestration device B 310b may be the key orchestration device 110. The key orchestration device A 310a and the key orchestration device B 310b may be in communication with one another through any suitable network. In particular, the key federation interfaces (e.g., the key federation interface 260) of each of the key orchestration device A 310a and the key orchestration device B 310b may be in communication with one another.

In various examples, the key management server A 330a and the key management server B 330b may be a device such as, but not limited to, the key generation and management device 230 and the key management interface 240. Each of the key management server A 330a and the key management server B 330b may be coupled to their respective key federation interfaces 206 within their respective enterprises in the manner described.

A device A 350a and a device B 350b may attempt to obtain an encryption key for the communication therebetween. Each of the device A 350a and the device B 350b may be the source device 150a, the target device 150b, the cellular device 250a, the network device 250b, . . . , the device N 250n, a combination thereof, and/or the like.

An encryption key may be generated within one enterprise (e.g., enterprise A 390a) from any suitable key source 170 in the manner described. The encryption key may be generated by the enterprise A 390a (e.g., by a key source 170 in the enterprise A 390a) with or without a request 170 from either enterprise B 390b or within enterprise A. The encryption key may likewise be generated by the enterprise B 390b in a similar manner. The encryption key and its associated key attributes 160 may be presented to the policy engine of enterprise A 390a (e.g., the key orchestration device A 310a, which may include the management request handler 205 and its associated components) for inspection in the manner described. In response to the policy engine of enterprise A 390a determining the encryption key is accepted based on the encryption key attributes 160, the key orchestration device 310a (e.g., the key federation interface 260) of enterprise A 390a may relate the encryption key as well as its associated key attributes 160 to the key orchestration device B 310b (e.g., the key federation interface 260) of enterprise B 390b.

Upon receiving the encryption key and its associated key attributes 160, the encryption key and its associated key attributes 160 may be presented to the policy engine of enterprise B390b (e.g., the key orchestration device B 310b, which may also include the management request handler 205 and its associated components) for inspection in the manner described. The encryption key may be forwarded to both the device A 350a and the device B 350b when the key orchestration device B 310b determines that the encryption key is consistent with its policies 115 defined for enterprise B 390b. In other words, the encryption key (as defined by its key attributes 160) may be allowed only if it is consistent with both sets of policies 115 of enterprise A 390a as well as enterprise B 390b. At least some of the set of policies 115 of enterprise A 390a may be different from at least some of the set of policies 115 of enterprise B 390b. Whereas the encryption key is found not allowable by either the key orchestration device A 310a or the key orchestration device B 310b, the encryption key may be returned back to the key source 170 with the "denied" message and/or the hint in the manner described.

In other examples, acceptance by policies 115 associated with only one enterprise (e.g., either enterprise A 390a or enterprise B 390b) may be sufficient for encryption key to be allowed. In such cases, the trust extends to some or sometimes all of the policies 115. In addition, each enterprise may include a set of policies 115 for the federated instances (e.g., each enterprise may have agreed with the other regarding a set of policies 115 used when communications between the communication devices of the enterprises are to occur. Accordingly, each enterprise may store (e.g., in each respective policy database 280) a same set of federated (mutual and reciprocal) policies for the federated schemes. The federated policies may be the same for both the enterprise A 390a and the enterprise B 390b. Thus, allowance by one key orchestration device associated with one enterprise may be sufficient for the encryption key to be forwarded for usage for communication between both enterprises.

In various examples, enterprise federation policies may be stored within each policy database 280. The enterprise federation policies may specify the manner in which the encryption keys may be federated. For example, the enterprise federation policies may specify the federated policies, which key orchestration device may inspect the key attributes 160, which enterprise may issue a request 175 for an encryption key, which enterprise may generate an encryption key, a combination thereof, and/or the like. The enterprise federation policies allow flexibility in policy defining. For example, the enterprise federation policies may specify that enterprises may each include its own policies 115 in addition to the federated policies, where at least a part the policies 115 of each enterprise may be disparate.

In some examples, a communication platform A 320a and a communication platform B 320b of each respective enterprise may be in communication with one another via any suitable network. Such communication between the communication platforms may be encrypted communications, where the encryption key corresponding to such communication may also be presented for inspection by policies 115 similar to described with respect to the devices (e.g., the device A 350a, the device B 350b, and/or the like). Each communication platform may be in communication to a respective device, such that configurations related to the key orchestration systems may be exchanged.

Figure 4:
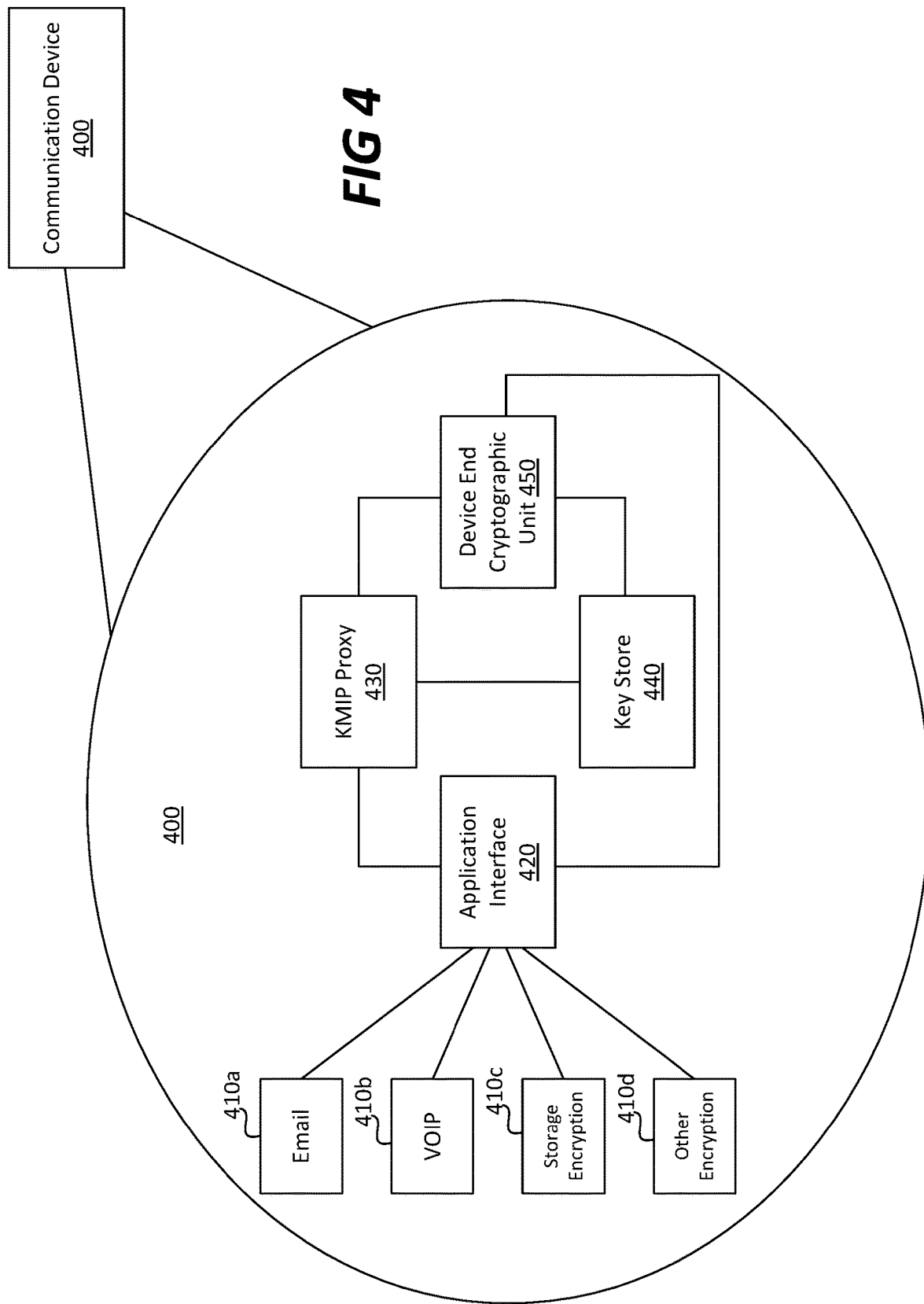
FIG. 4 is a schematic block diagram illustrating an example of a communication device consuming key orchestration services according to some examples.

FIG. 4 illustrates an example of a communication device 400 consuming key orchestration services as part of the enterprise according to some examples. Referring to FIGS. 1-4, the communication device 400 may be a device such as, but not limited to, the source device 150a, the target device 150b, the cellular device 250a, the network device 250b, . . . , the device N 250n, the device A 350a, the device B 350b, a combination thereof, and/or the like. In some examples, the communication device 400 leverages key orchestration to receive encryption keys (or key updates) associated with applications such as, but not limited to, an Email application 410a, voice-over-internet protocol (VOIP) application 410b, storage encryption 410c, and/or other encryption applications 410d on the communication device 400.

The communication device 400 may be registered with a key orchestration platform to receive key orchestration services. The communication device 400 may provide an application interface 420 based configured to receive with encryption key distribution and encryption key management messages (e.g., the "allowed" message, the "denied" message, the hint, and/or the like) from the key orchestration device 110. The application interface 420 may be coupled to each of the Email application 410a, voice-over-internet protocol (VOIP) application 410b, storage encryption 410c, and/or other encryption applications 410d to forward the accepted encryption key to them.

This communication device 400 may also utilize KMIP by a KMIP proxy 430 to receive KMIP type commands from the key orchestration device 110. The KMIP proxy 430 may be connected to the key store 440 for managing the encryption keys stored therein. The KMIP proxy 430 may also be connected to a device-end cryptographic unit 450. The device-end cryptographic unit 450 may be configured to generate encryption keys. In response to the "denied" message, the device-end cryptographic unit 450 may generated a different encryption key to present to the policy engine for inspection. Whereas the hint is given, the device-end cryptographic unit 450 may generate a different encryption key based on the hint. The device-end cryptographic unit 450 may cache its encryption keys in the key store 440. The device-end cryptographic unit 450 may be coupled to the application interface 420. The application interface 420 may transmit the encryption keys generated along with the key attributes 160 to the policy engine and forward the response of the policy engine to the device-end cryptographic unit 450 e.g., when the response is negative.

Accordingly, operation-level policy inspection may be achieved. Given that the communication device 400 may be capable to interact with the policy engine regarding the encryption keys, the ability to service the request for an encryption key (or inspect the encryption key) by a third-party device (e.g., the policy engine residing in the key orchestration device 110) acting as administrating may be achieved. The request 175 for an encryption key or the encryption key may be serviced each communication transaction.

Figure 5:
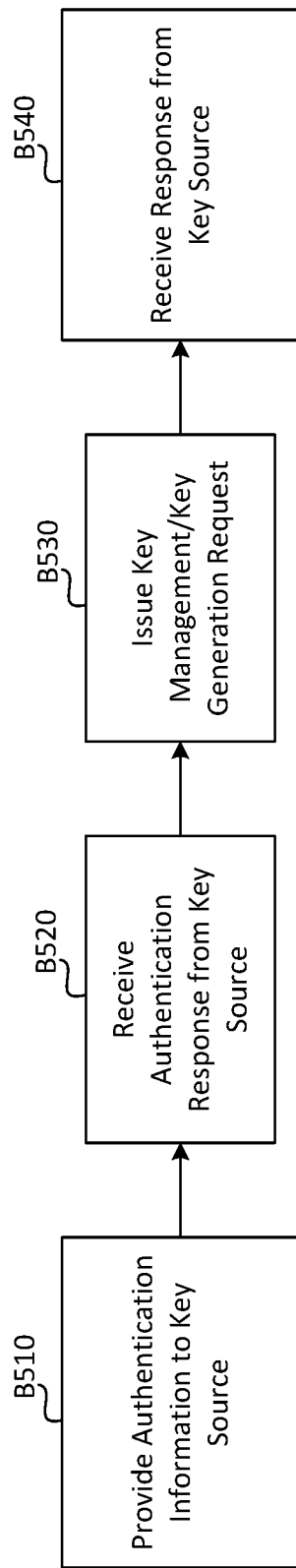
FIG. 5 is a process flow diagram illustrating an example of a request authentication process for issuing requests and receiving encryption keys according to some examples.

FIG. 5 illustrates an example of a request authentication process 500 for issuing requests 175 for encryption keys in various encryption key orchestration systems according to some examples. The request authentication process 500 may be internal to the key orchestration device 110, when the key orchestration device 110 (e.g., the management request handler 205, the key orchestration device A 310a, the key orchestration device B 310b, and/or the like) itself generates the encryption keys. In other examples, the request authentication process 500 may be external to the key orchestration device 110 to support integration with existing key management and key generation infrastructure (e.g., the key generation and management device 230, the key management server A 330a, the key management server B 330b, and/or the like).

First, at block B510, the key orchestration device 110 may provide authentication information to a key source 170. As described, such key source 170 may be the key orchestration device 110 itself, the key generation and management device 230, the management user interface 220, the key federation interface 260, the communication devices (e.g., the cellular device 250a, network device 250b, . . . , device N 250n, source device 150a, target device 150b, device A 350a, device B 350b, communication device 400, a combination thereof, and/or the like), and/or other external key sources. The authentication information may be any suitable authentication method, such as username/passcode request, security handshake algorithms, biometric request, a combination thereof, and/or the like.

Next, at block B520, the key orchestration device 110 may receive authentication response from the key source 170. The key orchestration device 110 may authenticate the response and establish trusted relationship between the key source 170 and the key orchestration device 110. Next at block B530, the key orchestration device 110, the management user interface 220, the key generation and management device 230, the communication devices, and other API calls may issue a key management/generation request (e.g., the request 175) to the key source 170. In some examples, the key orchestration device 110 may forward the request 175 from a trusted third party (e.g., the communication devices, the management user interface 220, the key federation interface 260, and/or other third-party devices) to the key source 170. In some examples, the request 175 may be directly sent to the key source 170. The key orchestration device 110 may be configured to determine whether to generate encryption keys itself or forward the request to another key source 170 when the request 175 does not identify the key source 170. Next, at block B540, the key orchestration device 110 may receive response (e.g., the encryption keys as requested) from the key source 170.

Subsequently, the encryption keys obtained by the key orchestration device 110 may be evaluated based on the key attributes 160 and the policies 115 in the manner described. When allowed, the encryption keys may be distributed to the communication devices associated with the corresponding communication transaction. When denied, the key orchestration device 110 may transmit the "denied" message (and in some instances, the hint) and standby for new encryption keys.

In some examples, multiple requests may be sent to a plurality of key sources 170; each request may correspond to a single communication transaction. In response, the multiple responses (e.g., encryption keys) may be received from the key sources 170. In other examples, multiple requests may be sent to a plurality of key sources 170, where two or more requests may correspond to a same communication transaction. As the key orchestration device 110 may receive two or more encryption keys from the key sources 170. The key orchestration device 110 may determine one of the two or more encryption keys for the communication transaction based on the policies 115 (e.g., the most secure out of the two or more encryption keys).

Accordingly, large scale distribution by the key orchestration device 110 may be possible in systems including at least one source for the encryption keys and multiple recipient communication devices.

Figure 6:
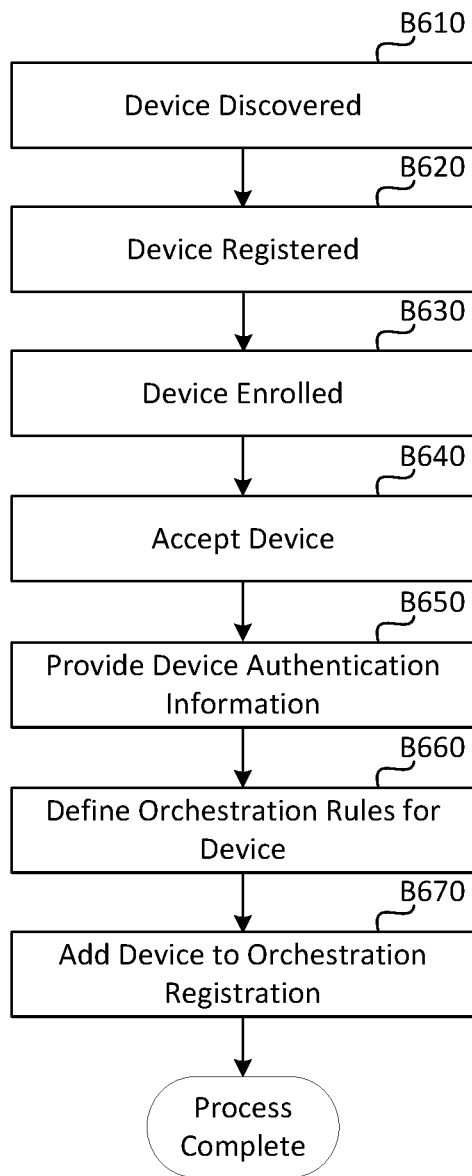
FIG. 6 is a process flow diagram illustrating an example of a communication device registration process implemented in various key orchestration systems according to various examples.

FIG. 6 is a process flow diagram illustrating an example of a communication device registration process 600 implemented in various key orchestration systems according to various examples. Blocks B610, B620, B630 may be executed simultaneously or sequentially in that order. First, at block B610 the communication device may be discovered (e.g., by the request handler 210). The request handler 210 may detect that the communication device is present within the enterprise (e.g., the networks associated with the enterprise) automatically.

At block B620, the communication device may be registered (e.g., by the request handler 210). In some examples, configuration information related to the key orchestration systems may be transmitted to the communication device. Device information of the communication device may be transmitted to the local user repository 285, device inventory database 295, and/or the like. At block B630, the communication device may be enrolled (e.g., by the request handler 210). For example, the communication device may transmit a server authentication request the request handler 210 and receiving a positive authorization response.

Next, at block B640, the communication device may be accepted (e.g., by the request handler 210). For example, the request handler 210 and/or the management request handler 205 may check existing policies 115 based on the device information to determine whether the communication device has been classified in the appropriate group, whether the key orchestration device 110 may be capable of orchestrating the communication device, a combination thereof, and/or the like.

Next, at block B650, the request handler 210 may provide device authentication information to the communication device. The authentication information may include configurations (e.g., credentials, passcodes, and/or the like) to access the key orchestration device 110. Next, at block B660, the request handler 210 and/or the management request handler 205 may define orchestration rules for the communication device. Following block B660 at block B670 a corresponding identifier, the commination device has been added to an orchestration registration. Subsequently, the communication device may request for encryption keys, generate encryption keys, receive approved encryption keys, and/or the like in the manner described. Such process ensures that the communication device utilizing services provided by the key orchestration device 110 may meet the operable standards of the key orchestration device 110.

Figure 7:
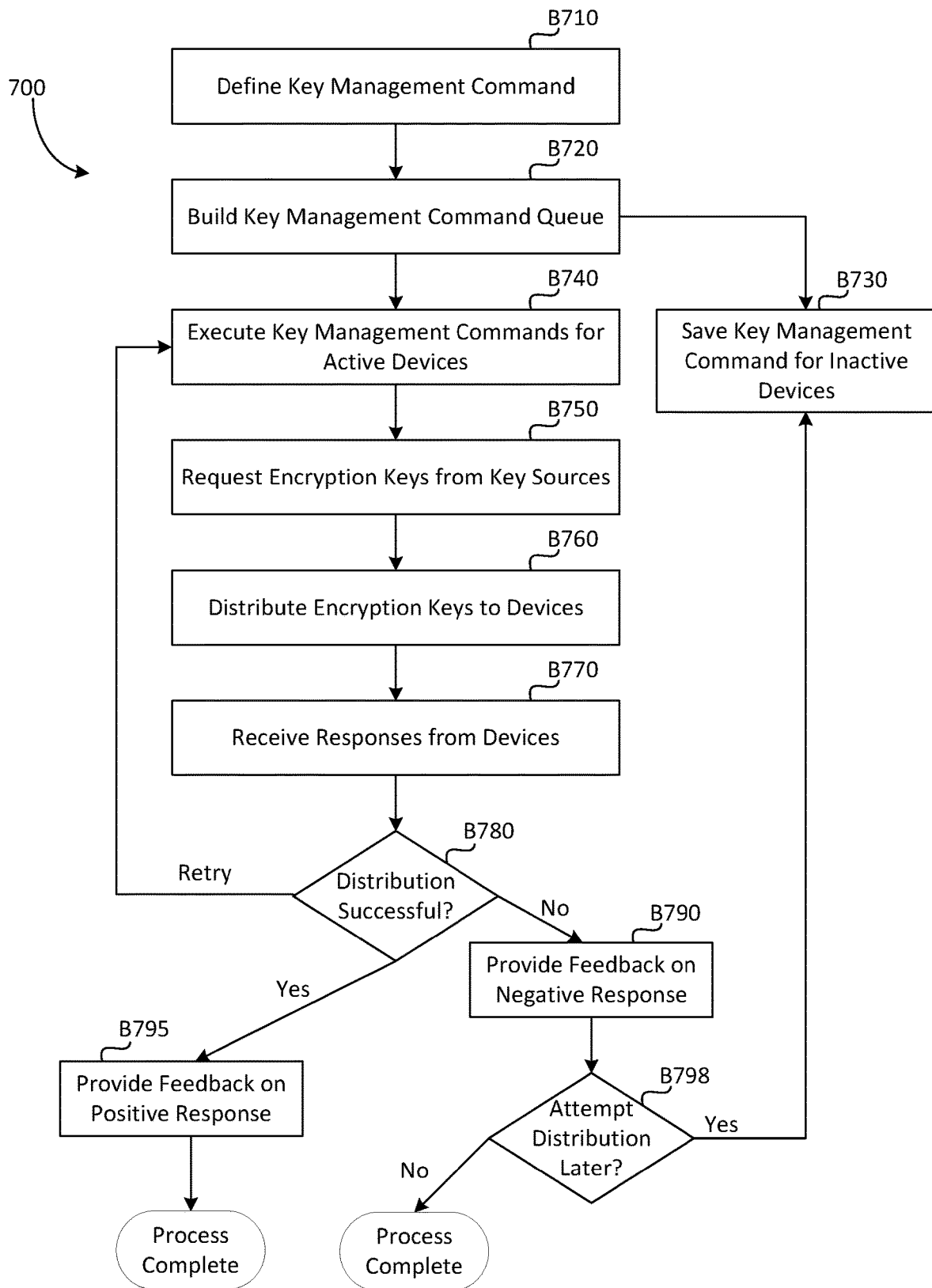
FIG. 7 is a process flow diagram illustrating an example of a key management and distribution process according to various examples.

FIG. 7 illustrates an example of a key management and distribution process 700 according to various examples. Referring to FIGS. 1-7, the key management and distribution process 700 may be implemented with communication devices registered, discovered, and/or enrolled with the key orchestration device 110.

First, at block B710, the management request handler 205 may define key management command. A key management command may be a particularized command for a key management event (e.g., "job"). The key management event may be an event triggering a set of algorithms to create encryption keys based on the policies 115 and distribute (e.g., push) the encryption keys to at least one of the communication devices (e.g., the cellular device 250a, network device 250b, . . . , device N 250n, source device 150a, target device 150b, device A 350a, device B 350b, communication device 400, a combination thereof, and/or the like).

In some examples, the key management event may be based on time. For example, the management request handler 205 may be configured to rekey for at least some (sometimes all) of the communication devices associated with the enterprise (or another enterprise) periodically (e.g., every day, every week, every month, and/or the like). In various examples, the key management event may occur automatically through an API call. The API call may be issued from any components internal and/or external to the key orchestration device 110 within a same or disparate enterprise.

The key management event may also be user-defined. For example, the management user interface 220 may receive user input from the designated user to generate encryption keys immediately for at least one communication device. In such examples, such user-defined key management events may be initiated in response to a sudden event, including cyber-attacks, security breaches, change to the polices 115, and/or the like. The management user interface 220 may also alter the policies 115 stored within the policy database 280 in response to these key management events. The new encryption keys created must follow the altered set of policies 115.

The key management command may include providing encryption key to some or all communication devices within the same or a disparate enterprise, re-transmitting a same or different encryption key to some or all communication devices within the same or disparate enterprise, a combination thereof, and/or the like. In various examples, the management request handler 205 may define for a plurality of key management commands, each of which may correspond to a communication transaction and/or communication device associated with the enterprise. In further examples, the management request handler 205 may define key management commands for communication devices associated with a disparate enterprise when allowed by the federation model. The management commands (e.g., encryption keys) may be transmitted via the key federation interfaces 260 associated with each enterprise.

Next, at block B720, the management request handler 205 may build a key management command queue. A job created in response to the key management event may include a plurality of key management commands, each of which may correspond to a communication device and/or a communication transaction. Accordingly, where the key management commands are generating new encryption keys and distributing to two or more communication devices, the key management commands may be queued (e.g., stored within the transactions database 275) for execution, given the volume of the key management commands. As such, a composite command may correspond to key management commands for multiple key sources to issue encryption keys to multiple encryption key receiving communication devices. The composite command may be associated with a plurality of key management commands, and may be stored as a whole in the transaction database 275 awaiting distribution. Thus, even if a server (e.g., the management request handler 205) is shut off before all the key management commands are executed/distributed, the process may resume as soon as the sever is switched on.

Key management command associated with inactive communication devices (e.g., communication devices that may be turned off and/or off the network) may be stored in the transactions database 275 for future distribution (e.g., when the inactive communication devices are switched on) by the management request handler 205 at block B730. On the other hand, for active devices (e.g., communication devices that may be turned on and/or on the network), the key management command may be executed by the management request handler 205 at block B740.

For example, the management request handler 205 may request encryption keys from key sources 170 based on the key management commands at block B750. For example, the key management commands may specify one or more key sources 170 to issue encryption keys to the communication devices. Accordingly, some communication devices may receive encryption keys from a first key source while other communication devise may receive encryption keys from a second different key source. Next, at block B760, the management request handler 205 may distribute encryption keys to the communication devices. In some examples, the management request handler 205 may perform encryption key inspection based on the key attributes 160 and the set of policies 115 in the manner described. Once approved, the management request handler 205 may forward the encryption keys to the corresponding communication devices through the request handler 210.

Next, at block B770, the management request handler 205 may receive response to the distribution from the communication devices. For example, the management request handler 205 may determine, based on the responses of the communication devices, whether such distribution was successful at block B780. Whereas the management request handler 205 determines that the distribution was successful with respect to a given communication device (e.g., that communication device has received the encryption key distributed to it), positive feedback may be provided to the management request handler 205 at block B795.

On the other hand, whereas the management request handler 205 determines that the distribution was unsuccessful (e.g., that communication device has not received the encryption key distributed to it) for a given communication device, a negative response of that communication device may be provided to the management request handler 205 at block B790. The management request handler 205 may then determine whether to attempt to execute the key management command again at a later time for that communication device based on preexisting algorithms or user input at block B798.

When management request handler 205 determines that execution of the key management commands (e.g., the distribution of the encryption) is not to be attempted again (B798:NO), the process ends. On the other hand, whereas the management request handler 205 determines that key management commands not successfully distributed are to be attempted again (B798:YES), the key management commands may be stored at block B730 (e.g., in the transactions database 275) for future distribution.

In some examples, when distribution of the key management commands may be unsuccessful, the management request handler 205 may determine to retry distribution of the unsuccessful key management commands (B780:RETRY). For example, the management request handler 205 may again execute key management commands for active devices at block B740.

Figure 8:
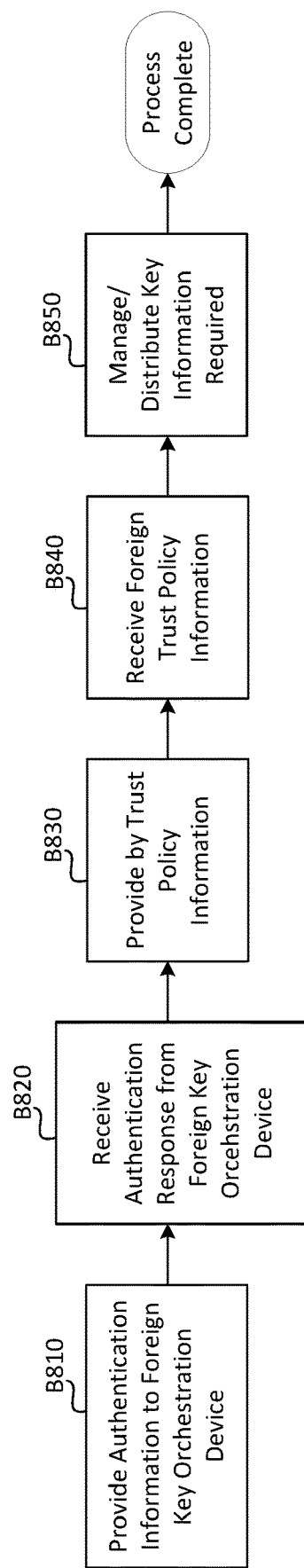
FIG. 8 is a process flow diagram illustrating an example of a key federation process according to various examples.

FIG. 8 is a process flow diagram illustrating an example of an encryption key federation process 800 according to various examples. Referring to FIGS. 1-8, key orchestration devices 110 (e.g., both in a same local enterprise and in a foreign enterprise) may mutually authenticate and distribute encryption keys based on the policies 115 implemented for key orchestration devices 110 or each enterprise for federating encryption keys from one enterprise to another enterprise. In addition, the encryption key federation process 800 may also include the receiving of encryption keys from a foreign key orchestration device as a result of the federation policy of the foreign key orchestration device.

First, at block B810, the local key orchestration device (e.g., the key orchestration device A 310a) may provide authentication information to a foreign key orchestration device (e.g., the key orchestration device B 310b). The authentication information may be any suitable authentication prompt and/or request for federation. Next, at block B820, the local key orchestration device may receive authentication response from the foreign key orchestration device agreeing to initiation the federation model. The blocks B810 and B820 may represent typical security credential handshakes, where federation trust has been established between the two enterprises.

Next, at block B830, the local key orchestration device may provide trust policy information to the foreign key orchestration device. At block B840, the local key orchestration device may receive trust policy information from the foreign key orchestration device. The trust policy information may include any configurations, settings, extent of trust, mutually agreed policies, a combination thereof, and/or the like.

Next, at block B850, the local key orchestration device and the foreign key orchestration device may manage and distribute key information (e.g., the encryption key, the associated key attributes 160, a combination thereof, and/or the like) in the manner described.

In particular examples, the foreign key orchestration device transmit the request 175 to the local key orchestration device for generating the encryption key for a communication transaction between a communication device associated with the foreign key orchestration device and a communication device associated with the local key orchestration device. The encryption key may be generated by the local key orchestration device and inspected by local policy engine. The encryption key may be transmitted to the foreign key orchestration device for inspection by the foreign policy engine in some examples, but not others.

In some examples, instead of the request 175, the foreign key orchestration device may transmit a generated encryption key (which may or may not have been inspected by policy engine of the foreign key orchestration device depending on trust policy information specified). The local key orchestration device may or may not inspect the encryption key and its associated key attributes 160 by policies 115 based on the trust policy information specified between the enterprises.

Figure 9:
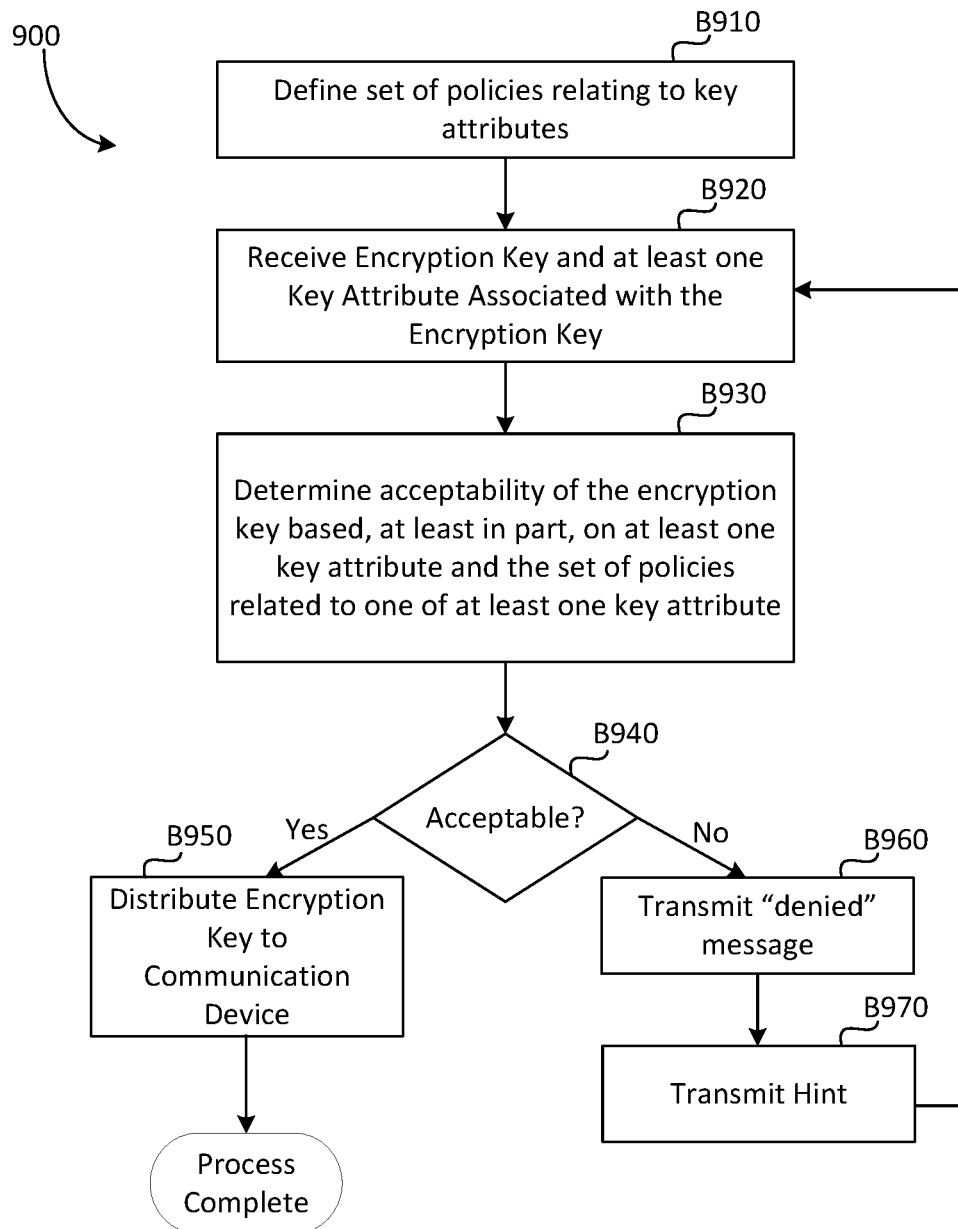
FIG. 9 is a process flow diagram illustrating an example of an encryption key management and distribution process according to various examples.

FIG. 9 is a process flow diagram illustrating an example of an encryption key management and distribution process 900 according to various examples. In various examples, the encryption key management and distribution process 900 may incorporate elements of key orchestration, including key management, key distribution, and key federation.

First, at block B910, a set of policies 115 may be defined, where each policy 115 may relate to one or more key attributes 160. The policies 115 may be defined by designed personnel and stored in the policy database 280 for future retrieval and update. Next, at block B920, the management request handler 205 may receive encryption key and at least one key attribute associated with the encryption key from the key source 170 in the manner described.

Next, at block B930, the management request handler 205 may determine acceptability of the encryption key received based, at least in part, on the at least one key attribute and the set of policies 115 that relate to one of the at least one key attribute. For example, the management request handler 205 may check a value corresponding to a key attribute 160 to determine whether the value is within an acceptable range as defined by the policies 115 in the manner described.

Next, at block B940, the management request handler 205 may determine whether the encryption key is acceptable. Whereas the encryption key is acceptable (B940:YES), the management request handler 205 may distribute the encryption key to the communication devices requiring the key for the communication transaction therebetween, at block B950. On the other hand, whereas the encryption key is unacceptable (B940:NO), the management request handler 205 may transmit the "denied" message to the key source 170 at block B960. Optionally, the management request handler 205 may transmit the hint to the key source to facilitate key generation at block B970. The management request handler 205 may then standby until receiving a second encryption key (and associated key attributes 160) at block B920.

The key orchestration system (e.g., the key orchestration device 110, the management request handler 205, key orchestration device A 310a, key orchestration device B 310b, and/or the like) described herein may be implemented on any suitable computing devices having a processor and a memory device. The processor may include any suitable data processing device, such as a general-purpose processor (e.g., a microprocessor), but in the alternative, the processor may be any conventional processor, controller, microcontroller, or state machine. The processor may also be implemented as a combination of computing devices, e.g., a combination of a DSP and a microprocessor, a plurality of microprocessors, at least one microprocessor in conjunction with a DSP core, or any other such configuration. The memory may be operatively coupled to the processor and may include any suitable device for storing software and data for controlling and use by the processor to perform operations and functions described herein, including, but not limited to, random access memory RAM, read only memory ROM, floppy disks, hard disks, dongles or other RSB connected memory devices, or the like.

The key orchestration device 110, the management request handler 205, key orchestration device A 310a, and/or key orchestration device B 310b may be implemented on suitable operating systems (OS) such as, but not limited to, the Linux OS, Windows, the Mac OS, and the like. Additionally, the key orchestration device 110, the management request handler 205, key orchestration device A 310a, and/or key orchestration device B 310b may be implemented on small form factors such as embedded systems.

In some examples, the policies 115 may be organized in a hierarchical structure for a structured organization of the policies 115. A structured organization may be a well-known, documented, and understood organization structure. For example, the policies 115 may be organized in a Directed Acyclic Graph in some examples. The Directed Acyclic Graph may be a hierarchical graph having nodes (vertices) and directed edges. The directed edges may indicate an order or hierarchy in which the nodes are organized. In other examples, the policies 115 may be organized in other suitable hierarchical structures such as, but not limited to, a tree. Each node of the Directed Acyclic Graph or tree may be associated with a particular hierarchical entity of the structured organization. Each node may represent a conceptual level, subdivision, department, collection of clients, and/or the like of a structured organization of a company or organization.

Figure 10:
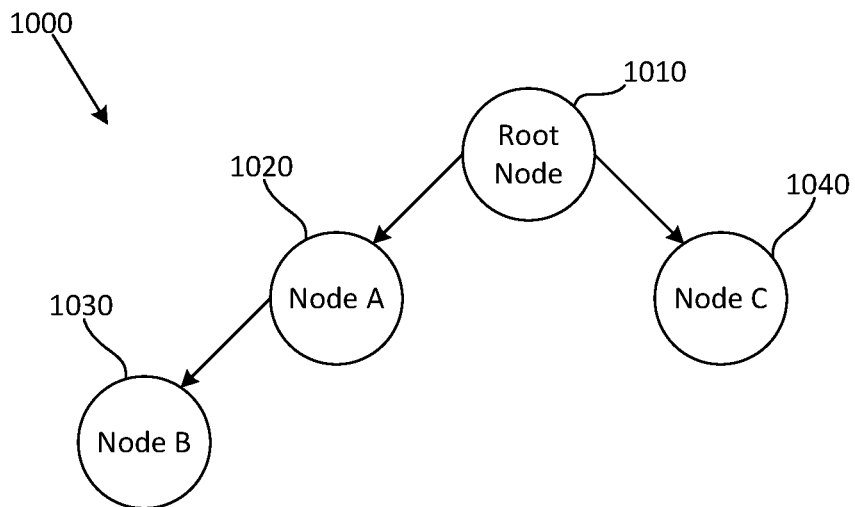
FIG. 10 is a diagram illustrating an example of a policy hierarchy according to some examples.

FIG. 10 is a diagram illustrating an example of a policy hierarchy 1000 according to some examples. Referring to FIGS. 1-10, the policy hierarchy 1000 may be a Directed Acyclic Graph having a root node 1010, Node A 1020, Node B 1030, and Node C 1040. A node (e.g., the root node 1010, Node A 1020, Node B 1030, or Node C 1040) may be associated with one or more devices such as, but not limited to, the source device 150a, the target device 150b, cellular device 250a, the network device 250b, . . . , the device N 250n, and/or the like. In some examples, a node may be associated with one or more devices such as, but not limited to, the key source 170, key generation and management device 230, and/or the like.

In addition or alternatively, each node may be associated with at least one policy 115 such as, but not limited to, the complex policies EQUAL, ONE-OF, MEMBER OF, NULL, NOT-NULL, GREATER-THAN, GREATER-THAN-OR-EQUAL-TO, LESS-THAN, LESS-THAN-OR-EQUAL-TO, and/or the like described herein. Accordingly, each device associated with a given node may also be associated with the policies 115 corresponding to that node.

In some examples, child nodes may inherit the policies 115 of parent node(s) based on parentage set forth in the policy hierarchy 1000. For example, the root node 1010 may be a parent node to Node A 1020 and Node C 1040. Node A 1020 and Node C 1040 may be child nodes to the root node 1010. Node A 1020 may be a parent node to Node B 1030. Node B 1030 may be a child node to Node A 1020. In some examples, policies 115 associated with the root node 1010 may also be associated with devices corresponding with Node A 1020 and Node C 1040 through inheritance. In some examples, policies 115 associated with Node A 1020 may be associated with devices corresponding to Node B 1030. In some examples, policies 115 associated with the root node 1010 may be associated with devices corresponding to Node B 1030, through inheritance.

In some examples, the policies 115 may be classified into groups for organizing the policies 115 in an ad hoc manner. An ad hoc organization is an impromptu, operation-driven implementation influenced by cross-functional organization operations. That is, ad hoc group may be defined based on need. Groups may be a vehicle to organizing nodes (e.g., the nodes 1010-1040), clients, users, and/or other groups. Clients may refer to devices that consume key orchestration services provided by the key orchestration device 110. For example, the clients may refer to one or more devices such as, but not limited to, the source device 150a, the target device 150b, cellular device 250a, the network device 250b, . . . , the device N 250n, and/or the like. Users may refer to consumers of key management interface 240 and/or the management user interface 220. For example, the users may refer to the key generation and management device 230.

Figure 11:
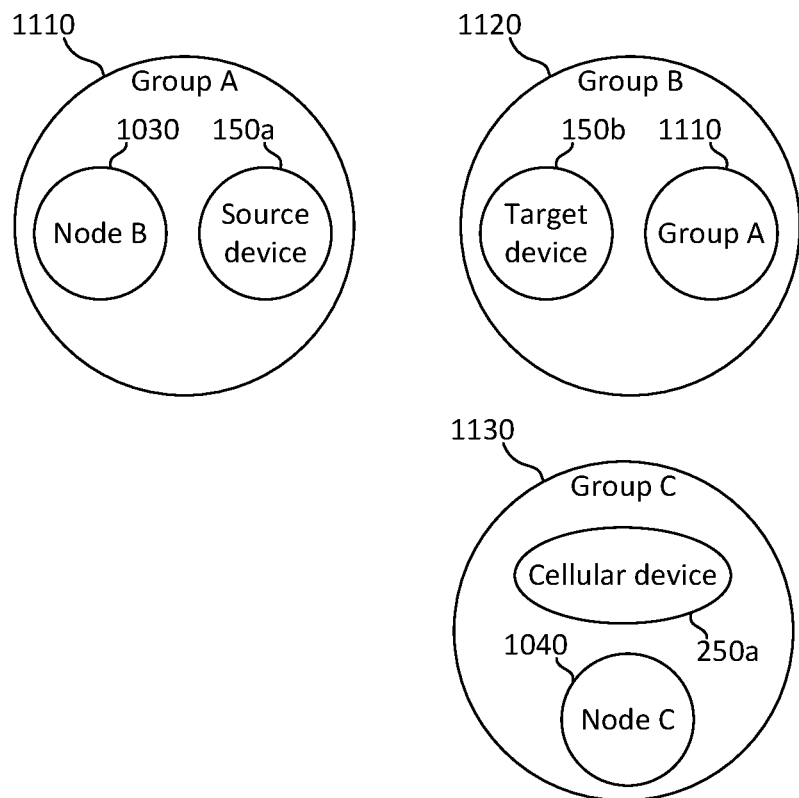
FIG. 11 is a diagram illustrating examples of groups according to some examples.

FIG. 11 is a diagram illustrating examples of groups 1110, 1120, and 1130 according to some examples. Referring to FIGS. 1-11, each of the groups 1110, 1120, and 1130 may be associated with a particular set of policies 115. Each of the groups 1110, 1120, and 1130 may include one or more of a node, client, user, and/or another group associating with the policies 115 of that group. For example, Group A 1110 may include Node B 1030 and the source devices 150a. In a non-limiting example, the source devices 150a may be associated with Node B 1030 in a policy hierarchy such as, but not limited to, the policy hierarchy 1000. In another non-limiting example, the source devices 150a may not be associated with Node B 1030 in the policy hierarchy (e.g., the source devices 150a may be associated with another node in the same policy hierarchy). Thus, groups may present a separate organization of policies 115 for nodes, clients, users, and/or the like as compared to the policy hierarchy, allowing additional control and flexibility in defining policies 115.

Group B 1120 may include the target device 150b and Group A 1110. In a non-limiting example, the target device 150b may not be included in Group A 1110, as shown in FIG. 11. In another non-limiting example, the target device 150b may be included in Group A 1110 in addition to Group B 1120. Group C 1130 may include the cellular device 250a and Node C 1040. In a non-limiting example, the cellular device 250a may be associated with node C 1040. In another non-limiting example, the cellular device 250a may not be associated with node C 1040. In other example, a Group may include those or other devices or nodes or other combinations thereof.

Nodes and groups may be separate vehicles to organize and define the policies 115. When used in combination, nodes and groups may allow flexible and convenient organization and definition of the policies 115, adding additional control and management of the policies 115. In some examples, the nodes may correspond to an existing structure of the structured organizations while groups can be used to classify some policies 115 based on need. Nodes may be used to organize and define the policies 115 associated with particular department, sub-department, and/or office of a company while groups may be used to organize and define the policies 115 associated with other criteria other than the existing structure of the company. The groups may be used to organize and define the policies associated with a particular type of devices, user, client, time, and/or other suitable criteria. Illustrating with a non-limiting example, a client of a particular transaction may be associated with a subsidiary company (e.g., the root node 1010), Los Angeles office (e.g., Node A 1020), accounting department (e.g., Node B 1030), and all devices associated with accounting departments across the subsidiary company (e.g., Group A 1110).

In some examples, the policies 115 may be defined and/or evaluated on a basis of a policy hierarchy (e.g., the policy hierarchy 1000). For example, each node (e.g., the nodes 1010-1040) may have a set of policies 115 associated with any device designated for that node. In some examples, the policies 115 may be defined and/or evaluated on a basis of groups (e.g., the groups 1110-1130). For example, each group may have a set of policies 115 associated with any node, client, user, or another group designated for that group.

In some examples, the policies 115 may be defined and/or evaluated on a basis of clients. For example, each client may be associated with a particular set of policies 115 for that client. Illustrating with a non-limiting example, an encryption key for the cellular device 250a may be defined and/or evaluated based on at least a first set of policies associated for the cellular device 250a while an encryption key for the network device 250b may be defined and/or evaluated based on a second set of policies associated with the network device 250b.

In some examples, the policies 115 may be defined and/or evaluated on a basis of users. For example, each user may be associated with a particular set of policies 115 for clients administrated by the user. Illustrating with a non-limiting example, an encryption key for a device administrated by the key generation and management device 230 may be defined and/or evaluated based on a first set of policies associated with the key generation and management device 230 while another device administrated by another user (such as, but not limited to, the key generation and management device 230) may be defined and/or evaluated based on a second set of policies associated with the another user.

In some examples, the policies 115 may be defined and/or evaluated based on a combination of one or more of the policy hierarchy, groups, clients, or users. Illustrating with a non-limiting example, with respect to a particular communication transaction or action of a particular device (e.g., the source device 150a, the target device 150b, cellular device 250a, the network device 250b, . . . , the device N 250n, and/or the like), an encryption key may be evaluated based on policies consistent with:

$$\Sigma\text{Node Policies} \cup \Sigma\text{Group Policies} \tag{1}$$

That is, the encryption key may be evaluated by a combination of policies corresponding to a node associated with the device and the policies corresponding to a group associated with the device.

Illustrating with another non-limiting example, with respect to a particular communication transaction or action of a particular device, an encryption key may be evaluated based on policies consistent with:

$$\Sigma\text{Node Policies} \cup \Sigma\text{Group Policies} \cup \Sigma\text{Client Policies} \cup \Sigma\text{User Policies} \tag{2}$$

That is, the encryption key may be evaluated by a combination of policies corresponding to a node associated with the device, the policies corresponding to a group associated with the device, the policies specific to that device (client), and the policies associated with the user administrating encryption keys for the device.

In some examples, the policies 115 may include an EQUAL (or EQ) policy. The EQUAL policy may be concerned with whether a key attribute of an encryption key is equivalent or identical to a policy value. Illustrating with a non-limiting example, the EQUAL policy may evaluate whether a size (e.g., length) of an encryption key is identical or equivalent to the policy value. Illustrating with another non-limiting example, the EQUAL policy may evaluate whether a name (or a portion thereof) of an encryption key is identical or equivalent to the policy value.

In some examples, the policies 115 may include an ONE-OF policy. The ONE-OF policy may be concerned with whether a key attribute of an encryption key is a member of a set. Illustrating with a non-limiting example, the ONE-OF policy may evaluate whether a size of an encryption key is one of a set of different sizes. Illustrating with another non-limiting example, the ONE-OF policy may evaluate whether a name (or a portion thereof) of an encryption key is one of a set of different names.

In some examples, the policies 115 may include a MEMBER-OF policy. The MEMBER-OF policy may be concerned with a parentage (with respect to the nodes) or association (with respect to groups) of a key attribute 160 of an encryption key. The key attribute 160 associated with the MEMBER-OF policy may be a client or user from which the encryption key is requested or generated. Illustrating with a non-limiting example, the MEMBER-OF policy may evaluate whether a given client or user is associated with a node or group based on a policy value. The policy value may indicate a name, tag, or another type of identifier representing the node or group. In some examples, a given client or user may be associated with a node or group for the purposes of the MEMBER-OF policy if the client or user directly belongs to the node or group. In additional or alternative examples, a given client or user may be associated with a node (e.g., Node A 1020) for the purposes of the MEMBER-OF policy if the client or user belongs to a child node (e.g., Node B 1030) or parent node (e.g., the root node 1010) of that node (e.g., Node A 1020). In additional or alternative examples, a given client or user may be associated with a group (e.g., Group B 1120) for the purposes of the MEMBER-OF policy if the client or user belongs to a group (e.g., Group A 1110) that is included in that group (e.g., Group B 1120).

In some examples, the policies 115 may include a NULL policy. The NULL policy may be concerned with whether a key attribute of an encryption key is set to NULL. Illustrating with a non-limiting example, the NULL policy may evaluate whether a date (e.g., date created, date deleted, date modified, date approved, date relocated, and/or the like) associated with an encryption key is set to NULL, as compared to another value. Illustrating with another non-limiting example, the NULL policy may evaluate whether a name of an encryption key is set to NULL, as compared to another value.

In some examples, the policies 115 may include a NOT-NULL policy. The NOT-NULL policy may be concerned with whether a key attribute of an encryption key is set to a non-NULL value. Illustrating with a non-limiting example, the NOT-NULL policy may evaluate whether a date (e.g., date created, date deleted, date modified, date approved, date relocated, and/or the like) associated with an encryption key is set to a non-NULL value, as compared to NULL. Illustrating with another non-limiting example, the NOT-NULL policy may evaluate whether a name of an encryption key is set to a non-NULL value, as compared to NULL.

In some examples, the policies 115 may include a GREATER-THAN policy. The GREATER-THAN policy may be concerned with whether a key attribute of an encryption key is greater than a policy value. Illustrating with a non-limiting example, the GREATER-THAN policy may evaluate whether a size of an encryption key is greater than a policy value. Illustrating with another non-limiting example, the GREATER-THAN policy may evaluate whether an ASCII value or a number of characters of a name (or a portion thereof) of an encryption key is greater than a policy value.

In some examples, the policies 115 may include a GREATER-THAN-OR-EQUAL-TO policy. The GREATER-THAN-OR-EQUAL-TO policy may be concerned with whether a key attribute of an encryption key is greater than or equal to a policy value. Illustrating with a non-limiting example, the GREATER-THAN-OR-EQUAL-TO policy may evaluate whether a size of an encryption key is greater than or equal to a policy value. Illustrating with another non-limiting example, the GREATER-THAN-OR-EQUAL-TO policy may evaluate whether an ASCII value or a number of characters of a name (or a portion thereof) of an encryption key is greater than or equal to a policy value.

In some examples, the policies 115 may include a LESS-THAN policy. The LESS-THAN policy may be concerned with whether a key attribute of an encryption key is less than a policy value. Illustrating with a non-limiting example, the LESS-THAN policy may evaluate whether a size of an encryption key is less than a policy value. Illustrating with another non-limiting example, the LESS-THAN policy may evaluate whether an ASCII value or a number of characters of a name (or a portion thereof) of an encryption key is less than a policy value.

In some examples, the policies 115 may include a LESS-THAN-OR-EQUAL-TO policy. The LESS-THAN-OR-EQUAL-TO policy may be concerned with whether a key attribute of an encryption key is less than or equal to a policy value. Illustrating with a non-limiting example, the LESS-THAN-OR-EQUAL-TO policy may evaluate whether a size of an encryption key is less than or equal to a policy value. Illustrating with another non-limiting example, the LESS-THAN-OR-EQUAL-TO policy may evaluate whether an ASCII value or a number of characters of a name (or a portion thereof) of an encryption key is less than or equal to a policy value.

FIG. 12 is a table 1200 illustrating examples of policies 115 having complex logical operations according to some examples. Referring to FIGS. 1-12, the policies 115 may be organized according to a node (e.g., Node Y), group (e.g., Group X), client (e.g., Client Z), and user (e.g., User Key Admin) according to some examples. In some examples, Client Z may be associated with Node Y in a hierarchical structure (e.g., the policy structure 1000) and Group X in terms of groups. For an encryption key of a given action or transaction of Client Z, relevant policies 115 may include, according to expression (2), a sum of policies associated with Node Y, Group X, Client Z, and User Key Admin. In other examples, the relevant policies 115 may include one or a combination of two or more of the policies 115 associated with Node Y, Group X, Client Z, or User Key Admin. The policies 115 of the table 1200 may be presented in a human-readable format for clarity. The policies 115 of the table 1200 may be stored in the policy database 280 in the manner described.

A policy name may identify a particular policy 115 in memory (e.g., in the policy database 280). A policy value may be a value based on which the relevant key attribute of the encryption key may be evaluated. The policy value may be set via the management user interface 220 or defined via any suitable manner for caching or storage. A policy type may identify particular types of policies, including, but not limited to, complex policies EQUAL, ONE-OF, MEMBER OF, NULL, NOT-NULL, GREATER-THAN, GREATER-THAN-OR-EQUAL-TO, LESS-THAN, LESS-THAN-OR-EQUAL-TO, and/or the like described herein. A policy operation may identify how the policies 115 are evaluated. For example, "ADD" may indicate that the corresponding policy 115 is to be evaluated in addition to other policies 115 that may apply.

In the non-limiting example of table 1200, Node Y may be associated with complex policies (e.g., "Job.Transaction.Create.Key.Size") related to the key size of an encryption key that has been created. The key size may be a key attribute 160 of an encryption key. In some examples, a first complex policy may indicate that the key size should be LESS-THAN-OR-EQUAL-TO 256 bits. In some examples, a second complex policy may indicate that the key size should be GREATER-THAN-OR-EQUAL-TO 128 bits. Thus, an encryption created having a size less than or equal to 256 bits and greater than or equal to 128 bits may be allowed per the combination of the first complex policy and second complex policy, as they are evaluated in combination.

In some examples, a third complex policy may indicate that the key size should be LESS-THAN 257 bits. In some examples, a fourth complex policy may indicate that the key size should be GREATER-THAN 127 bits. Thus, an encryption created having a size less than 257 bits (less than or equal to 256 bits) and greater than 127 bits (greater than or equal to 128 bits) may be allowed per the combination of the third complex policy and fourth complex policy, as they are evaluated in combination.

In some examples, Node Y may be associated with complex policies (e.g., "Job.Transaction.Get.Attribute.Deleted_Date") related to a delete date of an encryption key that has been created. For example, a fifth complex policy may indicate that a delete date of the encryption key should be NULL, instead of any other values. NULL indicates that the encryption key does not have a delete date (e.g., the encryption key has not been deleted).

In some examples, Node Y may be associated with complex policies (e.g., "Job.Transaction.Get.Attribute.Object.Group") related to parentage or association of the client (e.g., the Client Z) or the user (e.g., User Key Admin) of the policy operation in which an encryption key has been created. For example, a sixth complex policy may indicate that client or user (from which the encryption key is requested or generated) should be associated with a node or group identified by the name "Fresh."

In some examples, Node Y may be associated with at least one BOOLEAN policies such as, but not limited to, "Job.Transaction.Create.Key," which is related to whether the encryption key has been created.

In some examples, Group X may be associated with a seventh complex policies (e.g., "Job.Transaction.Create.Key.Encryption Mask") related to whether the encryption mask is a member of a set named "ENCRYPT DECRYPT ENCRYPT DECRYPT." The set may be a collection of encryption masks.

In some examples, Group X may be associated with complex policies (e.g., "Job.Transaction.Create.Key.Name") related to a name of an encryption key that has been created. For example, an eighth complex policy may indicate that a name of the encryption key should be not be NULL (NOT-NULL), instead of NULL. NOT-NULL indicates that the encryption key has been named.

In some examples, Client Z may be associated with complex policies (e.g., "Job.Transaction.Create.Key.Name") related to a name (a descriptive string attribute) of an encryption key that has been created. For example, a ninth complex policy may indicate that a name of the encryption key should EQUAL "foo," instead of another name. All other names may be denied according to this policy.

In some examples, the User Key Admin may have the same policies 115 as those of Node Y in the non-limiting example of the table 1200. In other examples, the User Key Admin may have at least one different policy 115 than one or more policies 115 of Node Y. The key attributes governed by the complex policies may include, but not limited to, key size, creation, deletion, date created, date deleted, object group, encryption mask, name, key name, and/or the like.

In some examples the complex policies may define unique fine-grained policies for encryption management that can be applied for not only encryption key management lifecycle, but to the actual management of the applied encryption key management server itself.

Figure 13:
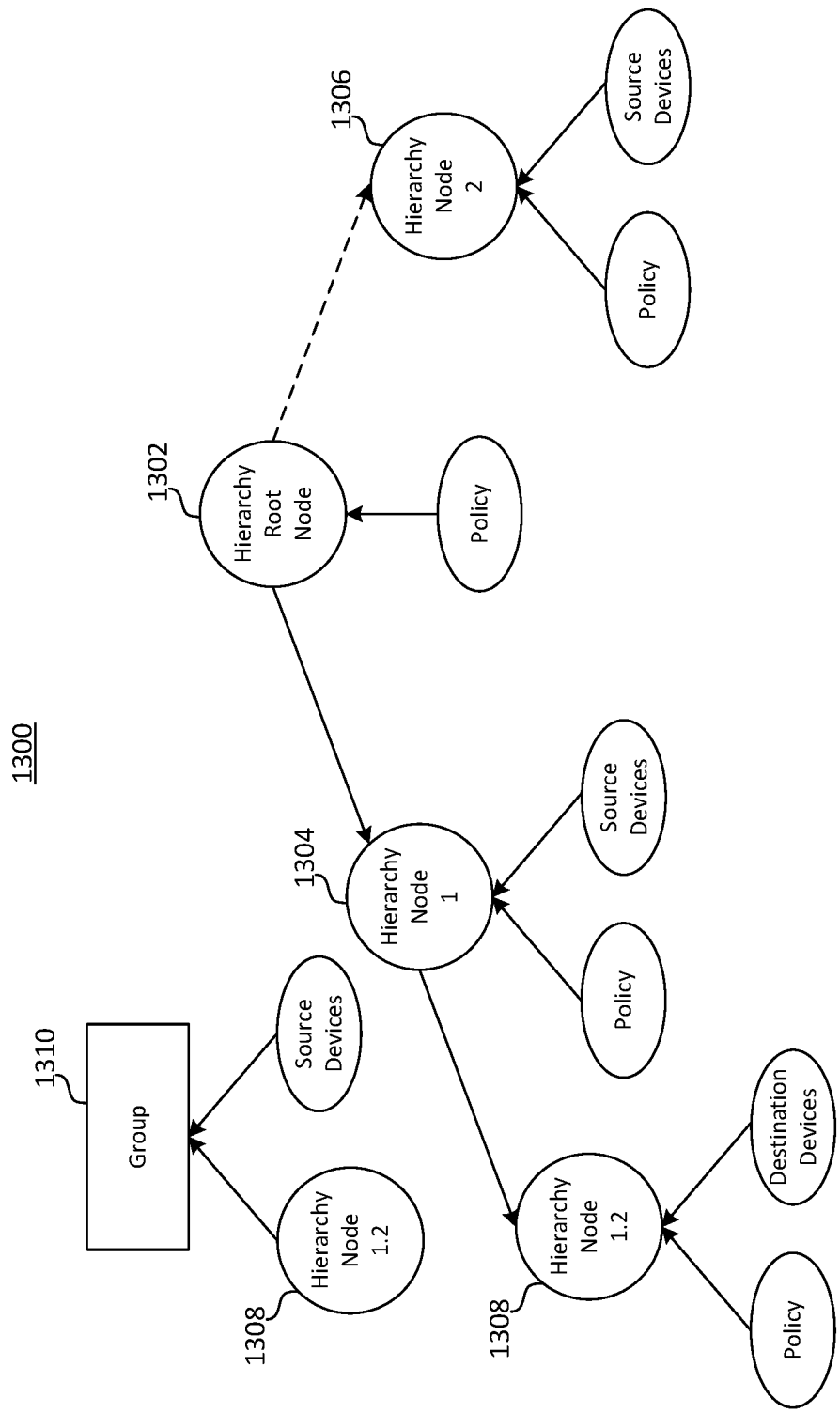
FIG. 13 is a diagram illustrating an example of a policy hierarchy and a group according to some examples.

FIG. 13 is a diagram illustrating an example of a policy hierarchy and a group according to some examples. Referring to FIGS. 1-13A, the policy hierarchy 1300 may correspond to policy hierarchy 1000. In particular examples, the policy hierarchy 1300 may include a plurality of hierarchy nodes 1302, 1304, 1306, and 1308. Node 1302 may be a hierarchy root node and may correspond to root node 1010. Nodes 1304 and 1306 may be second level nodes and the children of the root node 1302. Nodes 1304 and 1306 may correspond to nodes 1020 and 1040. Node 1308 may be a third level node and may be the child of nodes 1304 and 1302. Node 1308 may correspond to node 1030.

In some examples, the policy hierarchy 1300 may further include a group A 1310 including node 1308 (hierarchy node 1.2) and one or more source devices. Although group A 1310 is described as being a part of the policy hierarchy 1300, group A 1310 may not be within the hierarchal structure itself, but may encompass one or more components within the policy hierarchy (e.g., one or more nodes, one or more source devices, one or more destination devices, etc.). Group A 1310 may correspond to one or more of groups 1110, 1120, and 1130.

Figure 14:
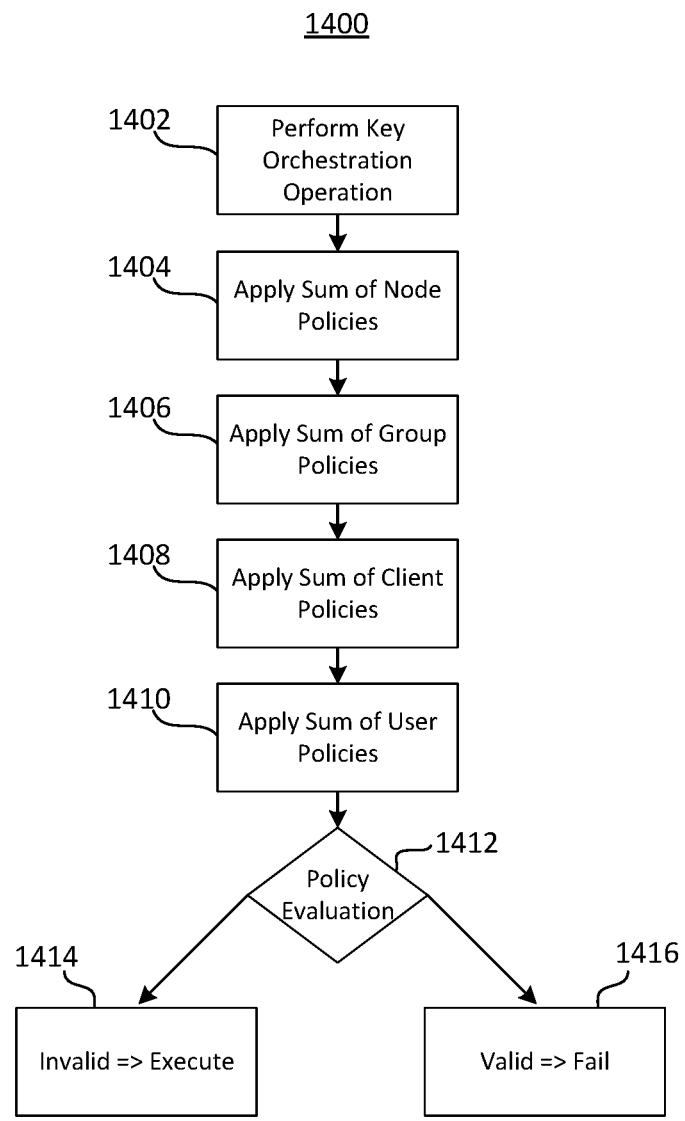
FIG. 14 is flowchart illustrating an example of a method for policy evaluation according to some examples.

FIG. 14 is flowchart illustrating an example of a method 1400 for policy evaluation according to some examples. Referring to FIGS. 1-14, and as discussed above, in some examples, the policies 115 may be defined and/or evaluated based on a combination of one or more of the policy hierarchy nodes, groups, clients, or users. Illustrating with a non-limiting example, with respect to a particular communication transaction or action of a particular device (e.g., the source device 150a, the target device 150b, cellular device 250a, the network device 250b, . . . , the device N 250n, and/or the like), an encryption key may be evaluated based on policies consistent with a combination of policies corresponding to a node associated with the device, the policies corresponding to a group associated with the device, the policies corresponding to a user (e.g., administrator of the key orchestration system 200), and/or the policies corresponding to the device itself.

Accordingly, method 1400 illustrates a process of evaluating policy in a policy cache (e.g., at a device) for operations executed (e.g., key orchestration operations). At step 1402, the method 1400 includes performing a key orchestration operation. As described above, a key orchestration operation may include key management, key federation, or key distribution activities in one or more enterprises. At step 1404, the method 1400 includes applying the sum of node policies for a given key orchestration operation. At step 1406, the method 1400 includes applying the sum of group policies for a given key orchestration operation. At step 1408, the method 1400 includes applying the sum of client policies for a given key orchestration operation. At step 1410, the method 1400 includes applying the sum of user policies for a given key orchestration operation.

At step 1412, the method 1400 includes making a policy evaluation with the complete set of policies applied in steps 1404, 1406, 1408, and 1408. At step 1414, if the policy evaluation is successful, the key orchestration operation performed in step 1402 is designated as valid, and the key orchestration operation is executed. However, at step 1416, if the policy evaluation fails, the key orchestration operation performed in step 1402 is designated as invalid and the key orchestration operation is not executed (fail). In some examples, the method 1400 may be implemented by the key orchestration system 200.

In some examples, the order of application of the policies, based on the entity associated with a policy (e.g., node, group, client, etc.) may be performed in the sequence illustrated in FIG. 14. For example, the sum of node policies may be applied first, the sum of group policies may be applied second, the sum of client policies may be applied third, and the sum of user policies may be applied fourth. Accordingly, in various examples, the adherence to the sequence illustrated in FIG. 14 allows the use of ad hoc groups in a policy hierarchy environment without violating the truth defined by the nodes. In some examples, the policy evaluation step 1412 may occur after each application of sum of policies step. For example, after step 1404, the operation can be evaluated based on the sum of node policies (1412), and after step 1406, the operation can be evaluated based on the sum of group policies (1412), and so on.

In some examples, a policy operation may include an action or transaction for evaluating at least one key attribute 160 of an encryption key. For a given policy operation, a policy replacement operation may be executed to replace an existing policy (e.g., a regular policy) with an ephemeral policy. An ephemeral policy may be a policy 115 that temporarily replaces, in a policy replacement operation, the existing policy for one or more designated policy operations. The ephemeral policy may correspond to a same key attribute 160 as the existing policy replaced by the ephemeral policy. That is, when the key attribute 160 is evaluated in a policy operation and an ephemeral policy is in play, the ephemeral policy may be used to evaluate the key attribute

160 instead of the corresponding existing policy. After the one or more designated policy operations are completed, the existing policy may be used for any subsequent policy operations in which the ephemeral policy does not replace the existing policy.

In terms of policy evaluation with respect to ad hoc groups, ephemeral polices may be part of the application of the sum of policies at step 1406. For example, an existing policy associated with a group may be replaced with an ephemeral policy. In such a case, the ephemeral policy may take precedence over the existing policy and may be included in the sum of group policies at step 1406, rather than the replaced existing policy of the group.

In various examples, the application of the sum of group policies step 1406 may be subject to certain rules with respect to multiple groups (e.g., when a group is associated with another group, which may be associated with yet another group, and so on). In some examples, when working with multiple group parents for a given group, the multiple groups may be ordered based on when a particular group was created. In some examples, the prioritization of groups may be based on time, sequence numbering, or other suitable methods of prioritizing groups for a set of policies based on when a group was created. In particular examples, the more recently a group was created, the higher priority the group has with respect to policies.

In some examples, various operations with respect to ad hoc groups may be utilized in a policy hierarchy environment. In some examples, the key orchestration system 200 may create groups and associate policies for that group in light of other groups (e.g., associate a first group with a second group such that policies of the second group are inherited by the first group). In some examples, the key orchestration system 200 may remove groups and remove policies associated with the groups in light of other groups (e.g., a first group that is part of a second group may be removed from the second group, and may accordingly have policies inherited from the second group removed from the first group). In some examples, the key orchestration system 200 may associate groups, nodes, clients, or users with other groups and policy to include precedence of the other groups and policy with the associated groups, nodes, clients, or users for evaluation of policy (e.g., precedence based on time of creation of a particular group). In some examples, the key orchestration system 200 may evaluate group precedence when building the sum of group policies with respect to ephemeral policies, as discussed above regarding ephemeral policies and ad hoc groups. In some examples, the key orchestration system 200 may disassociate groups, nodes, clients, or users with groups and policy (e.g., removed from a group, resulting in removal of policies associated with that group). In some examples, the key orchestration system 200 may define how group policy is inherited from multiple parent groups (e.g., by sequencing or prioritizing based on the time of creation for each group).

The examples described with respect to the FIGS. relate to encryptions keys. It should be appreciated by one of ordinary skills in the art that, in other examples, the systems and methods directed to the key orchestration device 110 involving management, distribution, and federation may be likewise implemented for other sensitive objects such as, but not limited to, user identity information, certificates, biometric data, random number generator data, determinate random number generator data, non-determinate random number generator data, user authentication information, policy components, other components associated with organization security component, and/or the like.

Complex policies are described with respect to Provisional Application No. 62/300,352 and Non-Provisional Application, each of which titled Policy-Enabled Encryption Keys Having Complex Logical Operations and incorporated herein by reference in its entirety. Ephemeral policies are described in detail in Provisional Application No. 62/300,521 and Non-Provisional Application, each of which titled Policy-Enabled Encryption Keys Having Ephemeral Policies and incorporated herein by reference in its entirety. Organization of the policies 115 are described in detail in Provisional Application No. 62/300,670 and Non-Provisional Application, each of which titled Structure Of Policies For Evaluating Key Attributes Of Encryption Keys and incorporated herein by reference in its entirety. Granular policies are described in detail in Provisional Application No. 62/300,687 and Non-Provisional Application, each of which titled Linking Encryption Key Management With Granular Policy and incorporated herein by reference in its entirety. Hierarchy manipulation is described in detail in Provisional Application No. 62/300,717 and Non-Provisional Application, titled System And Method For Hierarchy Manipulation In An Encryption Key Management System and incorporated herein by reference in its entirety.

Various examples described above with reference to the FIGS. include the performance of various processes or tasks. In various examples, such processes or tasks may be performed through the execution of computer code read from computer-readable storage media. For example, in various examples, one or more computer-readable storage mediums store one or more computer programs that, when executed by a processor cause the processor to perform processes or tasks as described with respect to the processor in the above examples. Also, in various examples, one or more computer-readable storage mediums store one or more computer programs that, when executed by a device, cause the computer to perform processes or tasks as described with respect to the devices mentioned in the above examples. In various examples, one or more computer-readable storage mediums store one or more computer programs that, when executed by a database, cause the database to perform processes or tasks as described with respect to the database in the above examples.

Thus, examples include program products comprising computer-readable or machine-readable media for carrying or having computer or machine executable instructions or data structures stored thereon. Such computer-readable storage media can be any available media that can be accessed, for example, by a general purpose or special purpose computer or other machine with a processor. By way of example, such computer-readable storage media can comprise semiconductor memory, flash memory, hard disks, optical disks such as compact disks (CDs) or digital versatile disks (DVDs), magnetic storage, random access memory (RAM), read only memory (ROM), and/or the like. Combinations of those types of memory are also included within the scope of computer-readable storage media. Computer-executable program code may comprise, for example, instructions and data which cause a computer or processing machine to perform certain functions, calculations, actions, or the like.

The examples disclosed herein are to be considered in all respects as illustrative, and not restrictive. The present disclosure is in no way limited to the examples described above. Various modifications and changes may be made to the examples without departing from the spirit and scope of the disclosure. Various modifications and changes that come within the meaning and range of equivalency of the claims are intended to be within the scope of the disclosure.

What is claimed is:

1. A method for implementing ad hoc groups in a policy hierarchy environment, the method comprising:
   receiving a key orchestration operation request, the key orchestration operation request being a request to perform a key orchestration operation based on one or more cryptographic attributes of one or more encryption objects, the one or more encryption objects used to encrypt data, the key orchestration operation being at least one of managing one or more uses of encryption, distributing one or more encryption objects, and coordinating one or more encryption objects among a plurality of applied key orchestration platforms, the key orchestration operation request received at a client device associated with a node of a policy hierarchy, a group, and a user, wherein the group is defined separately from the policy hierarchy;
   applying, to the request, based on a policy hierarchy, a combination of policies, wherein the policy hierarchy is a sequence of policies, the sequence of policies applied based on a creation time of the combination of policies, wherein the combination of policies comprises two or more of
   a sum of policies based on the policy hierarchy defined for the node,
   a sum of policies based on the policy hierarchy defined for the group,
   a sum of policies based on the policy hierarchy defined for the client, or
   a sum of policies based on the policy hierarchy defined for the user;
   evaluating the key orchestration operation request based on each policy of the combination of policies, comprising evaluating whether the one or more cryptographic attributes of the one or more encryption objects associated with the key orchestration operation request are cryptographically secure based on the combination of policies; and
   executing the key orchestration operation in response to a determination that the one or more cryptographic attributes of the one or more encryption objects associated with the key orchestration operation request are cryptographically secure, the key orchestration operation including transmitting the one or more encryption objects on a communication network, where the one or more encryption objects are used in encrypting data.

2. The method of claim 1, further comprising in response to the key orchestration operation request failing the evaluating based on the combination of policies, invalidating the key orchestration operation.

3. The method of claim 1, wherein the sum of policies defined for the group is applied after the sum of policies defined for the node is applied.

4. The method of claim 3, wherein the sum of policies defined for the client is applied after the sum of policies defined for the node is applied.

5. The method of claim 3, wherein the sum of policies defined for the user is applied after the sum of policies defined for the node is applied.

6. The method of claim 1, wherein evaluating the key orchestration operation request based on each policy of the combination of policies in the policy hierarchy comprises:
   evaluating the key orchestration operation request based on one of the sum of policies based on the policy hierarchy defined for the node, the sum of policies based on the policy hierarchy defined for the group, the sum of policies based on the policy hierarchy defined for the client, or the sum of policies based on the policy hierarchy defined for the user, the evaluation determining whether the key orchestration operation request is cryptographically secure; and
   evaluating the key orchestration operation request based on another one of the sum of policies based on the policy hierarchy defined for the node, the sum of policies based on the policy hierarchy defined for the group, the sum of policies based on the policy hierarchy defined for the client, or the sum of policies based on the policy hierarchy defined for the user, the evaluation determining whether the key orchestration operation request is cryptographically secure.

7. The method of claim 1, wherein evaluating the key orchestration operation request based on each policy of the combination of policies in the policy hierarchy comprises evaluating the sum of policies based on the policy hierarchy defined for the node, the sum of policies based on the policy hierarchy defined for the group, the sum of policies based on the policy hierarchy defined for the client, and the sum of policies based on the policy hierarchy defined for the user based on a sequence, the evaluation determining whether the key orchestration operation request is cryptographically secure.

8. The method of claim 1, wherein the group comprises at least one node of the policy hierarchy and a component outside of the policy hierarchy.

9. The method of claim 1, wherein the one or more cryptographic attributes comprise a size of each of the one or more encryption objects.

10. The method of claim 1, wherein the one or more cryptographic attributes comprises a time at which each of the one or more encryption objects is generated.

11. A non-transitory computer-readable medium comprising computer-readable instructions such that, when executed, causes a processor to:
    receive a key orchestration operation request, the key orchestration operation request being a request to perform a key orchestration operation based on one or more cryptographic attributes of one or more encryption objects, the one or more encryption objects used to encrypt data, the key orchestration operation being at least one of managing one or more uses of encryption, distributing one or more encryption objects, and coordinating one or more encryption objects among a plurality of applied key orchestration platforms, the key orchestration operation request received at a client device associated with a node of a policy hierarchy, a group, and a user, wherein the group is defined separately from the policy hierarchy;
    apply, to the request, based on a policy hierarchy, a combination of policies, wherein the policy hierarchy is a sequence of policies, the sequence of policies applied based on a creation time of the combination of policies, wherein the combination of policies comprises two or more of
    a sum of policies based on the policy hierarchy defined for the node,
    a sum of policies based on the policy hierarchy defined for the group,
    a sum of policies based on the policy hierarchy defined for the client, or
    a sum of policies based on the policy hierarchy defined for the user;
    evaluate the key orchestration operation request based on each policy of the combination of policies, comprising evaluating whether the one or more cryptographic attributes of the one or more encryption objects associated with the key orchestration operation request are cryptographically secure based on the combination of policies; and execute the key orchestration operation in response to a determination that the one or more cryptographic attributes of the one or more encryption objects associated with the key orchestration operation request are cryptographically secure, the key orchestration operation including transmitting the one or more encryption objects on a communication network, where the one or more encryption objects are used in encrypting data.

12. The non-transitory computer-readable medium of claim 11, wherein the computer-readable instructions, when executed, further cause the processor to, in response to the key orchestration operation request failing the evaluating based on the combination of policies, invalidating the key orchestration operation.

13. The non-transitory computer-readable medium of claim 11, wherein the sum of policies defined for the group is applied after the sum of policies defined for the node is applied.

14. The non-transitory computer-readable medium of claim 13, wherein the sum of policies defined for the client is applied after the sum of policies defined for the node is applied.

15. The non-transitory computer-readable medium of claim 14, wherein the sum of policies defined for the user is applied after the sum of policies defined for the node is applied.

16. A system for implementing ad hoc groups in a policy hierarchy environment, the system comprising:
a memory; and
a processor configured to:
receive a key orchestration operation request, the key orchestration operation request being a request to perform a key orchestration operation based on one or more cryptographic attributes of one or more encryption objects, the one or more encryption objects used to encrypt data, the key orchestration operation being at least one of managing one or more uses of encryption, distributing one or more encryption objects, and coordinating one or more encryption objects among a plurality of applied key orchestration platforms, the key orchestration operation request received at a client device associated with a node of a policy hierarchy, a group, and a user, wherein the group is defined separately from the policy hierarchy;
apply, to the request, based on a policy hierarchy, a combination of policies, wherein the policy hierarchy is a sequence of policies, the sequence of policies applied based on a creation time of the combination of policies, wherein the combination of policies comprises two or more of a sum of policies based on the policy hierarchy defined for the node,
a sum of policies based on the policy hierarchy defined for the group,
a sum of policies based on the policy hierarchy defined for the client, or
a sum of policies based on the policy hierarchy defined for the user;
evaluate the key orchestration operation request based on each policy of the combination of policies, comprising evaluating whether the one or more cryptographic attributes of the one or more encryption objects associated with the key orchestration operation request are cryptographically secure based on the combination of policies; and execute the key orchestration operation in response to a determination that the one or more cryptographic attributes of the one or more encryption objects associated with the key orchestration operation request are cryptographically secure, the key orchestration operation including transmitting the one or more encryption objects on a communication network, where the one or more encryption objects are used in encrypting data.

17. The system of claim 16, wherein the sum of policies defined for the group is applied after the sum of policies defined for the node is applied.

18. The system of claim 17, wherein the sum of policies defined for the client is applied after the sum of policies defined for the node is applied.

19. The system of claim 18, wherein the sum of policies defined for the user is applied after the sum of defined for with the node is applied.

20. A system for implementing ad hoc groups in a policy hierarchy environment, the system comprising:
means for receiving a key orchestration operation request, the key orchestration operation request being a request to perform a key orchestration operation based on one or more cryptographic attributes of one or more encryption objects, the one or more encryption objects used to encrypt data, the key orchestration operation being at least one of managing one or more uses of encryption, distributing one or more encryption objects, coordinating one or more encryption objects among a plurality of applied key orchestration platforms, the key orchestration operation request received at a client device associated with a node of a policy hierarchy, a group, and a user, wherein the group is defined separately from the policy hierarchy;
means for applying, to the request, based on a policy hierarchy, a combination of policies, wherein the policy hierarchy is a sequence of policies, the sequence of policies applied based on a creation time of the combination of policies, wherein the combination of policies comprises two or more of a sum of policies based on the policy hierarchy defined for the node,
a sum of policies based on the policy hierarchy defined for the group,
a sum of policies based on the policy hierarchy defined for the client, or
a sum of policies based on the policy hierarchy defined for the user;
means for evaluating the key orchestration operation request based on each policy of the combination of policies, comprising evaluating whether the one or more cryptographic attributes of the one or more encryption objects associated with the key orchestration operation request are cryptographically secure based on the combination of policies; and
means for executing the key orchestration operation in response to a determination that the one or more cryptographic attributes of the one or more encryption objects associated with the key orchestration operation request are cryptographically secure, the key orchestration operation including transmitting the one or more encryption objects on a communication network, where the one or more encryption objects are used in encrypting data.

* * * * *